(12) United States Patent
Rabinovich

(10) Patent No.: US 8,598,836 B1
(45) Date of Patent: Dec. 3, 2013

(54) STAR-DELTA MANY LEVELS STARTER FOR AN AC INDUCTION MOTOR

(75) Inventor: Ilya Yoilikovich Rabinovich, Tel Aviv (IL)

(73) Assignee: Ilya Rabinovich, Tel Aviv Gafo (IL)

( * ) Notice: Subject to any disclaimer, the term of this patent is extended or adjusted under 35 U.S.C. 154(b) by 322 days.

(21) Appl. No.: 12/317,916

(22) Filed: Dec. 31, 2008

(30) Foreign Application Priority Data

Jan. 20, 2008 (IL) .......................................... 188884

(51) Int. Cl.
*H02P 1/26* (2006.01)
(52) U.S. Cl.
USPC .......................................... 318/771; 318/772
(58) Field of Classification Search
USPC .......................... 318/771, 772, 778, 779, 780
See application file for complete search history.

(56) References Cited

U.S. PATENT DOCUMENTS

| | | | |
|---|---|---|---|
| 4,052,648 A | | 10/1977 | Nola |
| 4,456,865 A | * | 6/1984 | Robertson et al. ............ 318/599 |
| 5,008,608 A | | 4/1991 | Unsworth |
| 5,068,559 A | * | 11/1991 | Satake et al. .................. 310/112 |
| 5,068,587 A | * | 11/1991 | Nakamura et al. ............ 318/771 |
| 5,070,291 A | * | 12/1991 | Nakamura et al. .............. 318/77 |
| 5,818,195 A | * | 10/1998 | Frick et al. ..................... 318/771 |
| 6,275,405 B1 | * | 8/2001 | Pernyeszi ....................... 363/154 |
| 6,548,988 B2 | * | 4/2003 | Duff, Jr. ........................ 320/160 |
| 6,548,989 B2 | * | 4/2003 | Duff, Jr. ........................ 320/166 |
| 6,847,185 B2 | * | 1/2005 | Kume et al. ................... 318/732 |
| 7,245,110 B2 | * | 7/2007 | Duff, Jr. ........................ 320/166 |
| 7,330,000 B2 | | 2/2008 | Limor |

FOREIGN PATENT DOCUMENTS

JP 200217117 B1 6/2002
WO WO 00/77919 A1 12/2000

* cited by examiner

*Primary Examiner* — Rina Duda

(57) ABSTRACT

A star-delta multi-level starter is provided for controlling a starting and a slow stopping of an AC induction motor with desired quality, nevertheless changing conditions of a power supplying and a motor charge. An improving of a quality of the starting or the stopping is achieved as a result of an increasing number of power levels from two achieved in usual star-delta starter and producing effective changing of the power levels. The increasing number of the power levels is achieved by using electrical elements, such as resistors, transformers and others. The changing of the power levels is fulfilled at moments defined automatically. The changing, of the power levels may be fulfilled in any predetermined order, for example, in step-by-step increasing or decreasing order. The control system of the star-delta multi-level starter permits to use one parameter for changing desired quality of the starting, as in usual star-delta starters.

17 Claims, 13 Drawing Sheets

STAR-DELTA MANY LEVELS STARTER FOR AN AC INDUCTION MOTOR

FIELD OF INVENTION

This invention relates to motor control, and in particular, to a device of controlling the starting and stopping of an AC induction motor by limiting power, which able to receive the motor, by step-by step changing characteristics of electric current, supplied to the motor.

BACKGROUND OF THE INVENTION

Starting of an AC induction motor produces inrush current. Starters of AC induction motor changing characteristics of electric current supplied to an AC induction motor are widely used to produce desired starting process and to make inrush current lower.

In wildly used in modern industry starters: star-delta starter and auto-transformer starter, changes of voltage supplied to the motor fulfill step-by-step. Because of small number of steps and changing of steps in moments, which are far from optimal, the quality of start process is insufficient. Besides this, auto-transformer is used almost all time of start process. This fact influences on size of the auto-transformer.

Advantage of star-delta starter is that it uses electromagnetic system of the started motor by addition only two contactors and timer without outer electromagnetic system for starting. It is also cheapest of starters. It is easy to regulate it.

Star-delta starter permits to increase power consumption of the motor three times when star configuration of motor windings is changed to delta configuration. It is clear from this fact that an AC induction motor can receive on step of delta configuration of the windings two times greater addition of power than the addition of power on start step of star configuration of motor windings. That is the reason that current and duration of delta step of starting are greater than on star step.

In (PCT WO 00/77919) is made an attempt to start and control AC motor with better characteristics by periodically changing time of star period of motor starting because of aging of motor.

Addition of only one step of motor power changing between powers of star and delta configuration of the windings will permit to do more equivalent step additions of motor power and to receive equal quality during start period. Sometimes to achieve breakaway torque enough to supply to the motor less power than the motor receives on step of star configuration. With increasing number of steps it is possible to improve quality of motor starting, to make smoother motor starting, especially in difficult cases.

In (JP 200217117) is made an attempt to increase number of steps in delta configuration by introducing in each phase non-linear element parallel to power contact of contactor, producing delta configuration. This element permits two schemes in delta configuration: motor winding connected in series with non-linear element and motor winding without non-linear element. However, in star configuration this element increases current supplied to the motor because it is parallel to motor winding.

It is important to choose simple and cheap elements with constant characteristics, addition of which into structure of star-delta starter transform it into star-delta multi-level starter.

It is known control a system (U.S. Pat. No. 7,330,000), which is directed to controlling the level of a supply voltage applied to a load. It comprises circuitry, including at least one transformer having a primary winding being connectable across the supply voltage and a secondary winding being connected in series with the load. Further, a switching assembly is provided and operatively structured to be disposed in a first position serving to connect the primary winding across the supply voltage, thereby providing a voltage having an opposite polarity being introduced across the secondary winding of the transformer. Moreover, the switching assembly, being disposed in a second position, serves to disconnect the primary winding from across the supply voltage and to shunt the primary winding so that voltage across the secondary winding is zero.

Control circuit of star-delta starter changes open and close position of contactors, which define motor windings configuration, through preset time interval introduced into timer. However, with increasing number of steps of addition of power to the motor it is increased difficulty of selecting of time intervals of the steps or moments of steps changing. It is preferable, if control circuits will do it automatically.

It is also needed sometimes that a stop process of AC induction motor will be within definite characteristics, for example, smooth stopping. In soft starters smooth stopping is achieved by gradually increasing firing angle of thyristors (U.S. Pat. Nos. 4,052,648, 5,008,608).

It must be understood, that effective starting and stopping of an AC induction motor may be achieved, if the improvement will concern two aspects:
 increasing number of stepped changing of the motor power consumption,
 starting new step in the moment, when transition conditions of previous step are near to be finished.

Therefore, it is a primary object and feature of present invention to provide an improved star-delta starter as star-delta multi-level starter for controlling the starting and stopping of an AC induction motor.

It is a further object and feature of present invention to provide an improved control circuit for controlling the starting and stopping of an AC induction motor in effective manner.

It is still a primary object and feature of present invention to provide an improved star-delta starter for controlling the starting and stopping of an AC induction motor, which utilizes traditional and less expensive components.

SUMMARY OF THE INVENTION

In accordance with the present invention, a star-delta multi-level starter is provided for controlling an AC induction motor. The starter includes input terminals for connecting to an AC source, output terminals for connecting to an AC induction motor, three-phase contactors for producing star and delta configurations, a control circuit and a power-limiting device with input and output and control terminals. Coils and signal contacts of the contactors and the control terminals of power-limiting device connected to the control circuit.

Preferable embodiments permit according to user selection to produce three, four and five step starting and stopping with an unchangeable element in the changeable phase component of the power limiting device.

Preferable embodiments difference from each other by place of the power-limiting device, inside or outside of delta configuration of motor windings, before or after the motor. Order of connection of the motor and the power-limiting device may have an influence in case of usage of non-linear elements in the changeable phase component of the power-limiting device.

Three steps starting and stopping is possible to produce by switching on and off the element if it is used one of structures:

the changeable phase component and the motor winding connected in series in each phase in star configuration, the changeable phase component and the motor winding connected in series in each phase in delta configuration, the changeable phase component connected in each phase of power supply line and the motor windings are in delta configuration.

Four steps starting and stopping is possible to produce by switching on and off the element if it is used one of structures:

the changeable phase components and the motor windings connected in series in each phase in star configuration and in delta configuration, or if the changeable phase component connected in each phase power supply line and the motor windings are in star and delta configuration.

Five steps starting and stopping is possible to produce by switching on and off the element if the changeable phase components and the motor windings connected in series in each phase in star and in delta configurations and the changeable phase component connected in each phase on power supply line and the motor windings are in delta configuration.

In regards to power-limiting device, every device, which can change parameters of electric current supplied to the motor with compare with electric current of power source so that motor power consumption will be changed in desired direction, may be used as power-limiting device. However, it is important that such device, which is used a little time in compare with working time of the motor, will be cheap.

In preferred embodiment the power-limiting device consists of an element from the list: resistor, choke, capacitor, varistor and SIDACtor, and additional three-phase contactors, wherein the element and the contactor with power contacts connects to the first power terminals and to the second power terminals of the power-limiting device and coil and signal contacts of the contactors connected to control terminals of the power-limiting device. The elements have fixed and limited possibility to change characteristics of electric current.

In preferred embodiments, in which a three-phase transformer included in the power-limiting device number of additional three-phase contactors increased to three because of necessity to disconnect the transformer from circuit when it is not used for changing electric current supplied to the motor.

Influence of the transformer on characteristics of electric current depends of transformation ratio of the transformer and connections of the transformer windings. Transformation ratio of the transformer increases with increase of number of starting steps. Increasing of transformation ratio permits to increase power of the transformer with the same sizes. So, the power of the started motor also may be increased.

Selecting different connection of primary transformer windings gives different value of voltage changed by the transformer as result of changing linear voltage on taps of primary windings. This fact gives a path to regulate start or stop processes on stage of mounting.

However, it is possible to control value of voltage change of the transformer by configuration the transformer during starting or stopping.

In preferred embodiments for this purpose three-phase transformer of the power-limiting device includes five transformer three-phase contactors. These contactors allow to produce five different connections of primary winding taps and to receive five levels of voltage changing on secondary windings. As a result, there is a possibility to seventeen power levels by using transformer with transformer contactors in structure of star-delta multi-level starter, which permits five steps of power level changing when elements have fixed characteristics.

It is possible to use a control circuit with timers for power level changing control. However, with increasing number of levels it is more difficult to regulate starting or stopping. It is preferable to change the levels automatically.

In preferred embodiment the control circuit consists of a moment defining circuit for defining moment of power level changing and a level changing circuit for fulfilling power level changing.

The moment defining circuit includes first sensor of effective voltage, second sensor of one parameter of next list: speed of the motor rotation, phase effective current through the windings and motor power, first differentiator for defining the voltage change speed, second differentiator for defining the parameter change speed, first comparator for comparing voltage change speed and preset voltage change speed, second comparator for comparing the parameter change speed and preset parameter change speed, first preset device for voltage preset change speed, connected to first comparator, second preset device for the parameter preset change speed, connected to second comparator, first zero-relay of change speed of the voltage, second zero-relay of change speed of the parameter.

The level changing circuit includes AND gates, level relays with two opened contacts and some closed contacts for control actuation of level control lines connected to first taps of coils of contactors, which closed position form corresponding power level, and devices for controlling position of contactors. Number of AND gates, which is the same as number of level relays, is equal to number of power levels minus one. Number of level control lines is equal to number of power levels. Number of devices for controlling position of contactors is equal to number of contactors.

The control circuit also includes control voltage source, START and STOP buttons, interlocking relay.

Components of the control circuit interconnected in next manner.

First sensor, first differentiator, first comparator and first zero-relay connected in series.

Second sensor, second differentiator and second comparator connected in series, and output of second comparator connected to second zero-relay through closed contact of first zero-relay.

The level control lines connected to first taps of coils of contactors, closed position of which forms corresponding power level.

The devices for controlling position of contactors interconnect with corresponding contactors. Outputs of the devices for controlling position of contactors, which first taps of coils connected to control lines, connect to inputs of the AND gates of the power levels corresponding to level control lines.

First taps of coils of the level relays connected to the AND gates of the previous power level through closed contacts of second zero-relay.

Phase output of control voltage source through STOP button and START button, to which in parallel connected opened contact of interlocking relay, connected through first opened contact of now in use level relay and closed contacts of next level relays to the level control lines, through second opened contact of the level relays to their first taps of coils, through opened contact of first zero-relay to first tap of coil of second zero-relay, to first tap of coil of the interlocking relay and to the devices for control position of contactors, and neutral output of control voltage source connected to second coils taps of interlocking relay, the zero-relays, the level relays and the contactors.

In else one preferred embodiment the control circuit, which permits fulfilling starting and slow stopping with defining moments of power level changing automatically, consists of the moment defining circuit with the same structure and a level changing circuit with more complex structure.

The moment defining circuit includes first sensor of effective voltage, second sensor of one parameter of next list: speed of the motor rotation, phase effective current through the windings and motor power, first differentiator for defining the voltage change speed, second differentiator for defining the parameter change speed, first comparator for comparing voltage change speed and preset voltage change speed, second comparator for comparing the parameter change speed and preset parameter change speed, first preset device for voltage preset change speed, connected to first comparator, second preset device for the parameter preset change speed, connected to second comparator, first zero-relays of change speed of the voltage, second zero-relay of change speed of the parameter.

The level changing circuit enabling, fulfilling slow stopping includes AND gates and level relays with two opened contacts and some closed contacts for control changing of level control lines connected to first taps of coils of contactors, which closed position form corresponding power level, devices for controlling position of contactors. Number of AND gates is equal to number of power levels minus one. Number of level relays and number of level control lines is equal to number of power levels. Number of devices for controlling position of contactors is equal to number of contactors.

The level changing circuit enabling fulfilling slow stopping includes first and second slow stop control relays, slow stop finishing relay.

The control circuit also includes control voltage source, START button, STOP button and SLOW STOP button and interlocking relays for START and SLOW STOP buttons.

Components of the control circuit interconnected in next manner:
First sensor, first differentiator, first comparator and first zero-relay connected in series. Second sensor, second differentiator and second comparator connected in series, and output of second comparator connected to second zero-relay through closed contact of first zero-relay.

Each level control line connected to first taps of coils of contactors, closed position of which forms corresponding power level.

The devices for controlling position of contactors interconnected with corresponding contactors.

Outputs of the devices for controlling position of those contactors, which first taps of coils connected to level control lines, connected to inputs of the AND gates correspondingly to the power levels of level control lines.

Output of the AND gate of selected power level connected to first tap of coil of the level relay of next power level through connected in series closed contact of first slow stop control relay, which connected to the AND gate output, and closed contact of second zero-relay, which connected to the level relay of next power level. The same output of the AND gate of selected power level connected to first tap of coil of the level relay of previous power level through connected in series opened contact of first slow stop control relay, which connected to the AND gate output, and closed contact, of second zero-relay, which connected to the level relay of previous power level. In such manner connected each AND gate, excepting of AND gate of first power level. Output of AND gate of first power level connected to the slow stop finishing relay through connected in series opened contact of first slow stop control relay, which connected to first AND gate output, and closed contact of second zero-relay, which connected to first tap of coil of the slow stop finishing relay.

Phase output of control voltage source through closed contact of slow stop finishing relay, the button STOP and button START, to which in parallel connected opened contact of interlocking relay, connected to phase line.

Phase line connected to:
the level control lines through first opened contact of level relay for now in use power level and closed contacts of level relays for next power levels, first tap of coil of the level relay of selected power level through series circuit of closed contact of second slow stop control relay, closed contact of level relay for control next power level and second opened contact of level relay of selected power level; and through series circuit of opened contact of second slow stop control relay, closed contact of level relay for control previous power level and also second opened contact of level relay of selected power level, for each power level excepting of first and maximum power levels, first tap of coil of the level relay of maximum power level through series circuit of closed contact of second slow stop control relay and second opened contact of level relay of maximum power level, first tap of coil of the level relay of first power level through series circuit of closed contact of first slow stop control relay and closed contact of level relay of first power level, first tap of coil of the level relay, which one step lower than maximum power level, through opened contact of first slow stop control relay connected in series with closed contact of the level relay, first tap of coil of second zero-relay through opened contact of first zero-relay, the devices for control position of contactors,
first tap of coil of the interlocking relay,
first tap of coil of the slow stop finishing relay through connected in series closed contact of the first slow stop control relay and closed contact of second zero-relay, SLOW STOP button and opened contact of the slow stop interlocking relay and through them to first tap of coil of the slow stop interlocking relay and first taps of coils of the first and the second slow stop control relays.

Neutral output of the control voltage source connected to second coils taps of the interlocking relay, the slow stop finishing relay, the slow stop control relays, the zero-relays, the level relays and the contactors.

BRIEF DESCRIPTION OF THE DRAWINGS

The drawings furnished herewith illustrate a preferred construction of the present invention in which the above advantages and features are clearly disclosed as well as others. The advantages and features will be readily understood from the following description of the illustrating embodiments.

In the drawings.

Figure 7A:
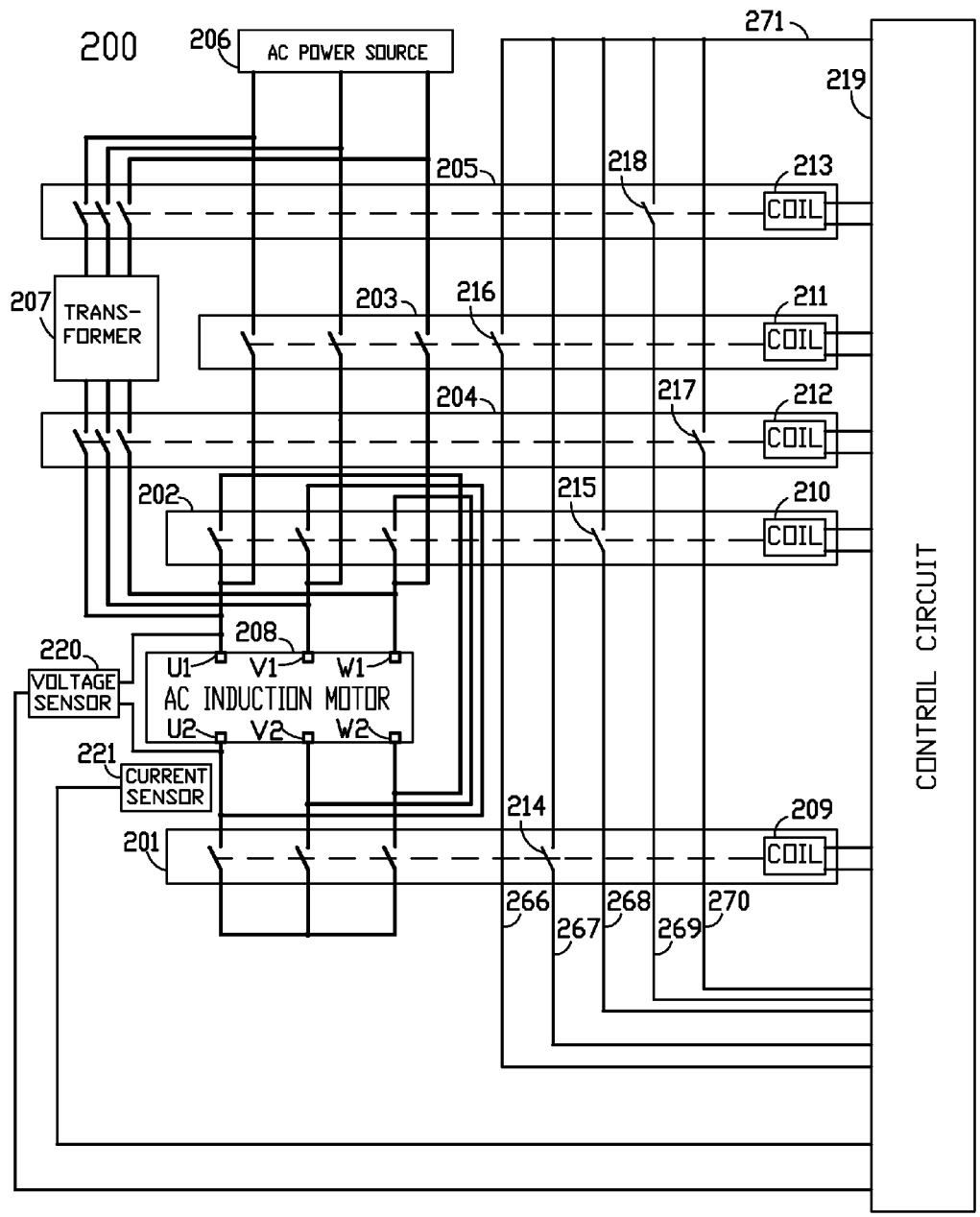
FIGS. 7A, 7B and 7C point on a circuit diagram of a motor system with the star-delta multi-level starter, which includes a control circuit with automatic power level changing, in accordance with present invention. The control circuit of FIG. 7B automatically defines moments of power level changing during starting, in accordance with present invention.
Figure 7B:
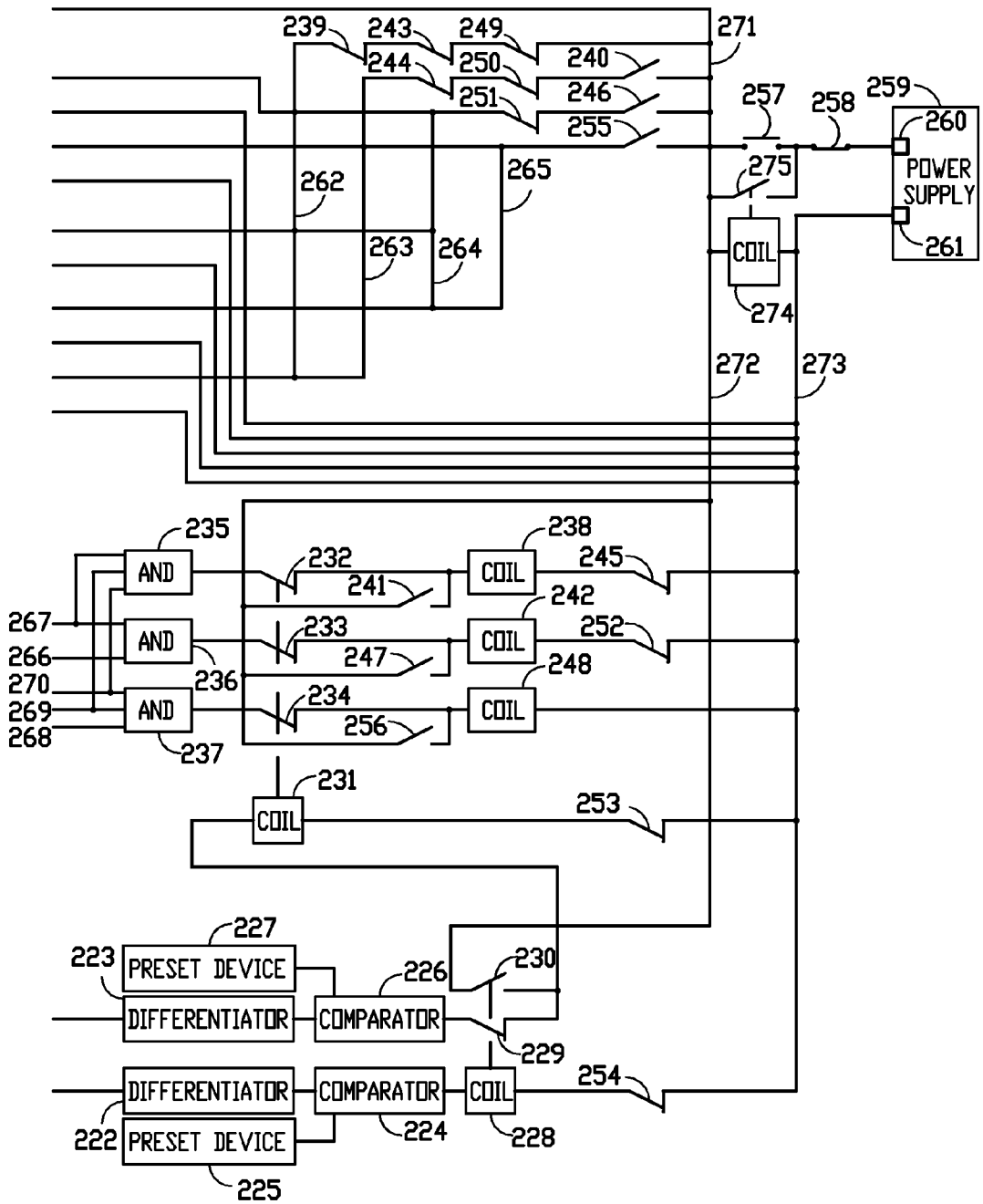
Figure 7C:
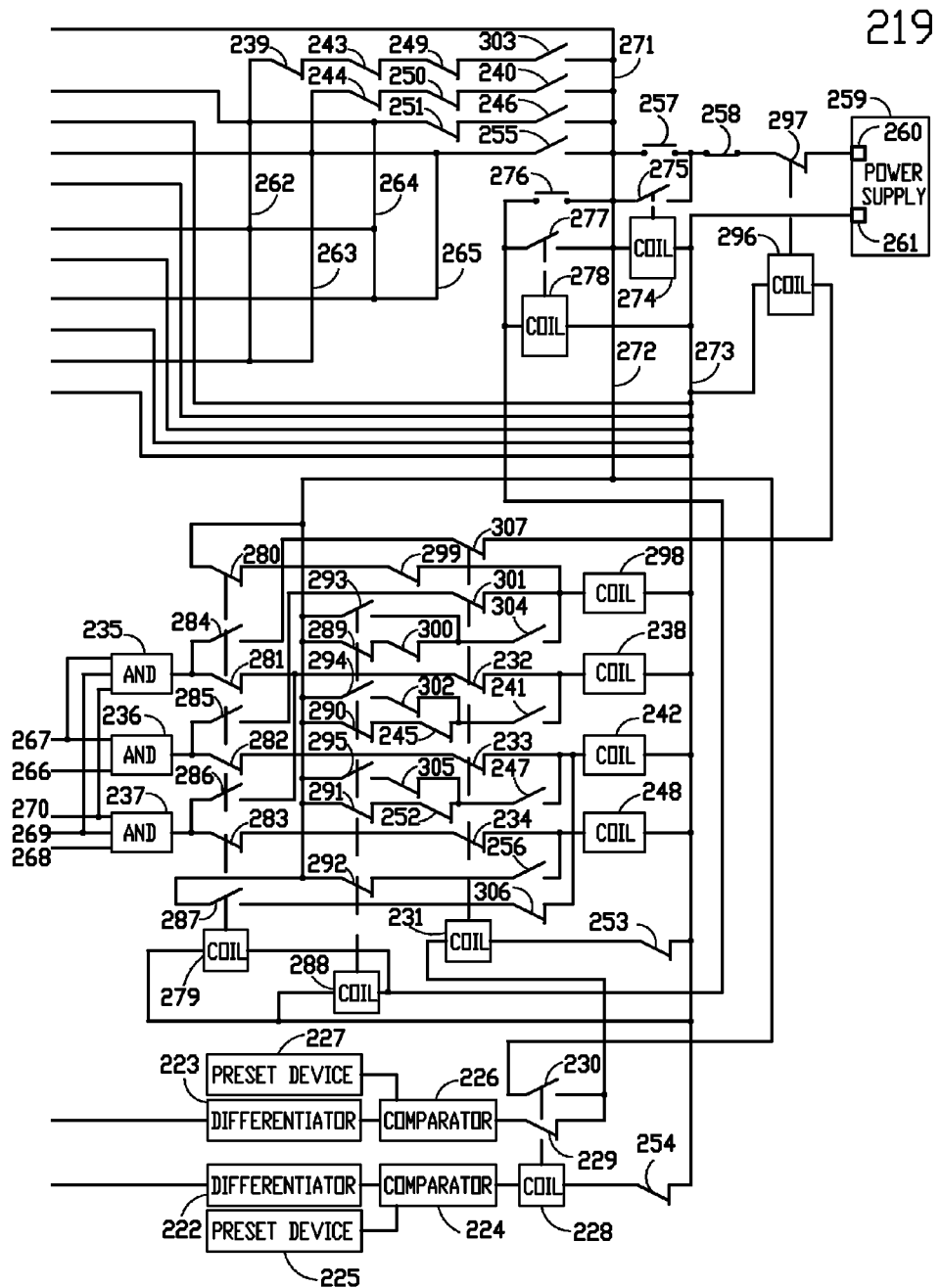

The control circuit of FIG. 7C controls starting and slow stopping with defining moments of power level changing automatically, in accordance with present.

DETAILED DESCRIPTION OF THE DRAWINGS

FIGS. 1A, 1B, 1C and 1D define realizations of a system, including the star-delta multi-level starter for starting and stopping of an induction motor and the motor, of the invention.

Referring to FIGS. 1A, 1B, 1C and 1D, motor systems with the star-delta multi-level starter in accordance with the present invention are generally designated by the reference number 10. The motor control systems include an AC induction motor 12 having terminals U1, V1, W1, U2, V2 and W2. Motor 12 connects with terminals U1, V1, W1, U2, V2 and W2 to star-delta starter 14 through its output terminals 15a, 15b, 15c, 15d, 15e and 15f by power conductor lines 16a, 16b, 16c, 16d, 16e and 16f. Input terminals 17a, 17b and 17c of star-delta starter 14 connect to a three-phase AC power source 18 by power conductor lines 19a, 19b and 19c. As it is conventional, power source 18 provides line voltages $V_A$, $V_B$ and $V_C$ and line currents $I_A$, $I_B$ and $I_C$ through corresponding supply lines 19a, 19b and 19c to star-delta starter 14. Phase voltages $V_a$, $V_b$ and $V_c$ between beginning taps U1, V1 and W1 and ending taps U2, V2 and W2 of motor windings 20a, 20b and 20c and phase currents $I_a$, $I_b$ and $I_c$ through motor windings 20a, 20b and 20c of motor 12, in accordance with different power levels, are produced by star-delta starter 14.

Star-delta starter 14 comprises a contactor 21 to produce a star configuration of phase series electric circuits including phase motor windings; a contactor 22 to produce a delta configuration of phase series electric circuits including the motor windings; a power-limiting device 23; and a control circuit 24. Control circuit 24 transfers control to contactors 21 and 22 and to power-limiting device 23 by lines 25, 26 and 27 and receive information from the devices by lines 28, 29 and 30. Power-limiting device 23 connects to other devices through first power terminals 31a, 31b and 31c as power inputs; second power terminals 32a, 32b and 32c as power outputs; and control terminals 33a and 33b. The power contacts of contactor 21 on one side connect to power contacts of contactor 22 on one side by power conductor lines 35a, 35b and 35c. The power contacts of contactor 21 connect on contrary side to wire 34.

Figure 1A:
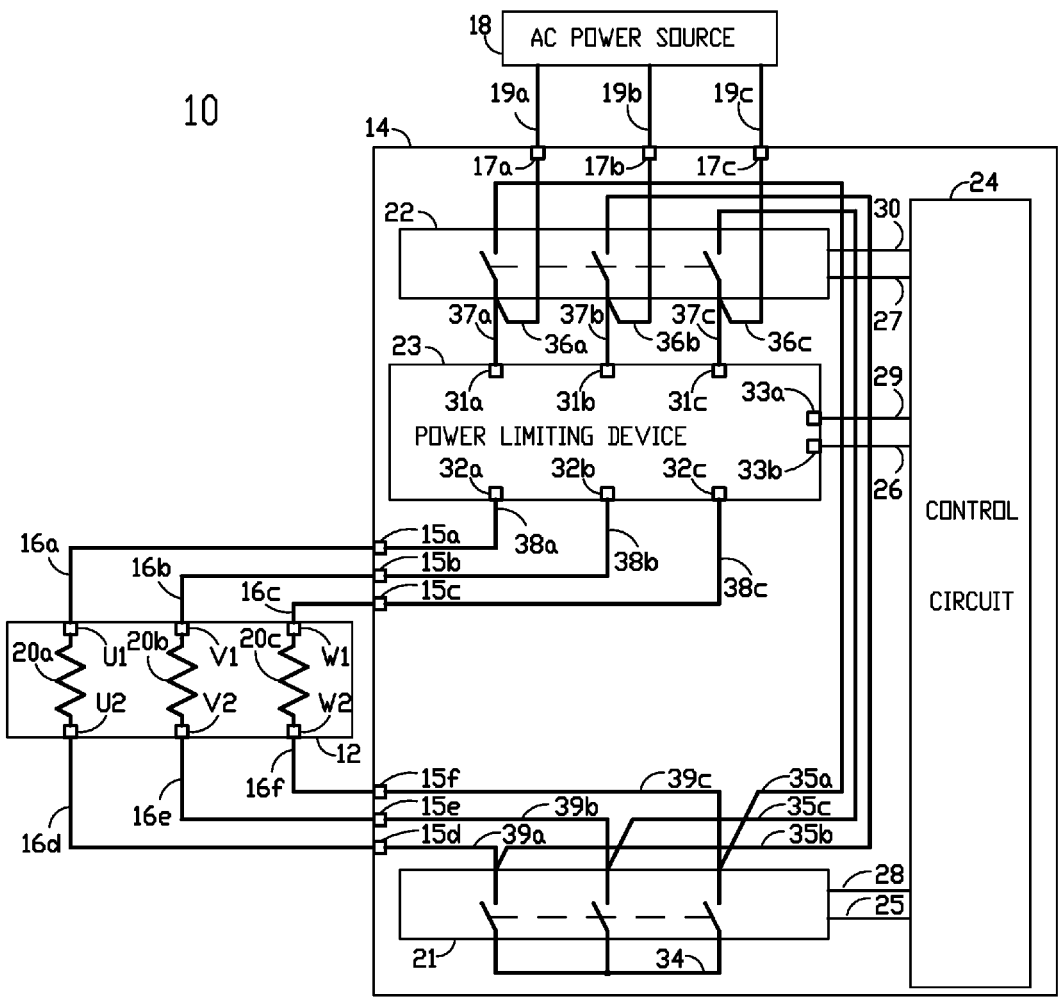
FIGS. 1A, 1B, 1C and 1D are circuit diagrams of a star-delta multi-level starter for an AC induction motor, in accordance with embodiments of the invention.

FIG. 1A illustrates a motor starting system with star-delta starter 14, where power-limiting device 23 is electrically positioned between contactor 22 and beginning taps U1, V1 and W1 of motor windings 20a, 20b, and 20c. Power conductor lines 36a, 36b and, 36c connect input terminals of the starter 17a, 17b and 17c with the power contacts of contactor 22 on contrary side. Power conductor lines 37a, 37b and 37c connect first power terminals 31a, 31b and 31c of the power-limiting device 23 with the power contacts of contactor 22 on contrary side. Lines 38a, 38b and 38c connect second power terminals 32a, 32b, and 32c of power-limiting device 23 with output terminals 15a, 15b and 15c of the starter. Power conductor lines 39a, 39b and 39c connect output terminals 15d, 15e and 15f of the starter to the power contacts of contactor 21 on contrary side.

Figure 1B:
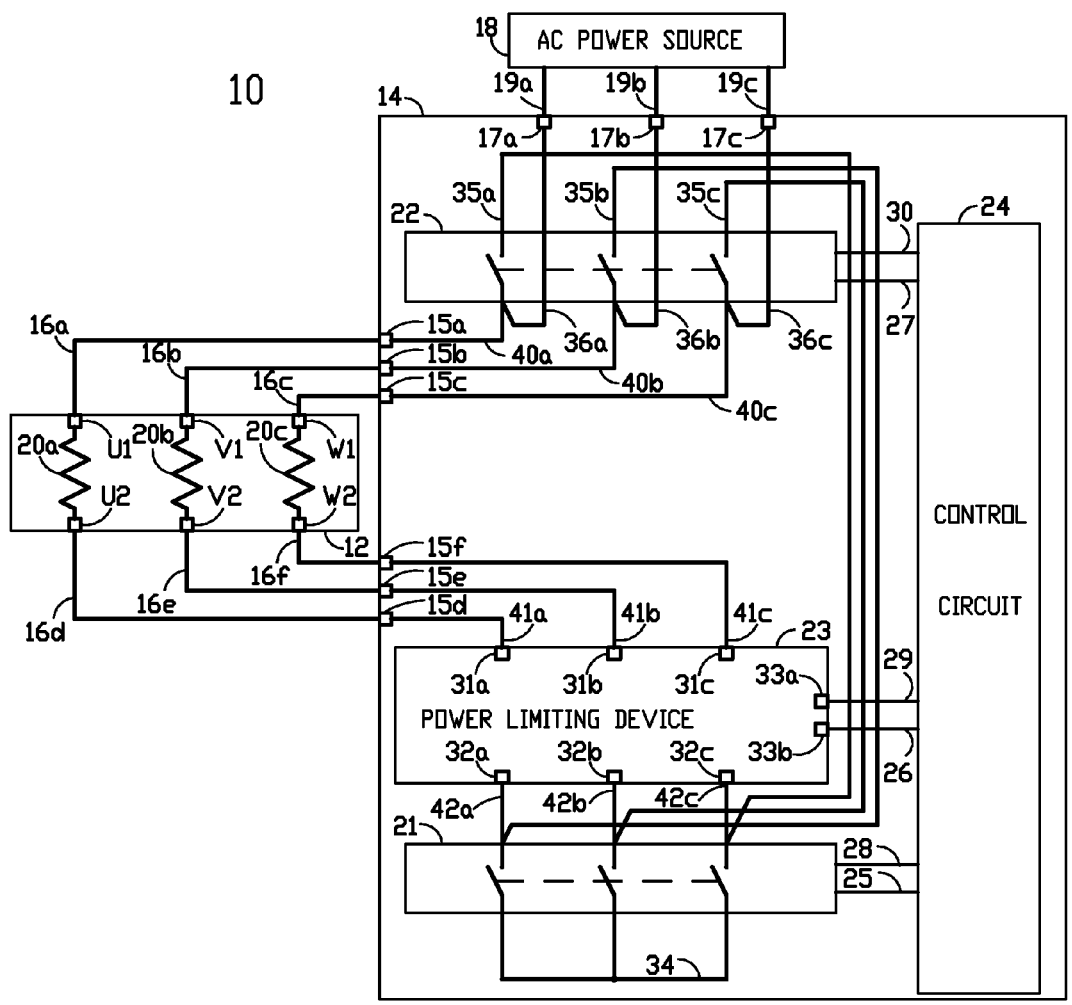

FIG. 1B illustrates a motor starting system with star-delta starter 14, where power-limiting device 23 is electrically positioned between the contrary side of contactor 21 and ending taps U2, V2 and W2 of motor windings 20a, 20b and 20c. Power conductor lines 36a, 36b and 36c connect power input terminals 17a, 17b and 17c of the starter with the power contacts of contactor 22 on contrary side. Power conductor lines 40a, 40b and 40c connect output terminals 15a, 15b and 15c of the starter with the power contacts of contactor 22 on contrary side. Power conductor lines 41a, 41b and 41c connect output terminals 15d, 15e and 15f of the starter with first power terminals 31a, 31b and 31c of power-limiting device 23. Power conductor lines 42a, 42b and 42c connect second power terminals 32a, 32b and 32c of power-limiting device 23 to the power contacts of contactor 21 on contrary side.

Figure 1C:
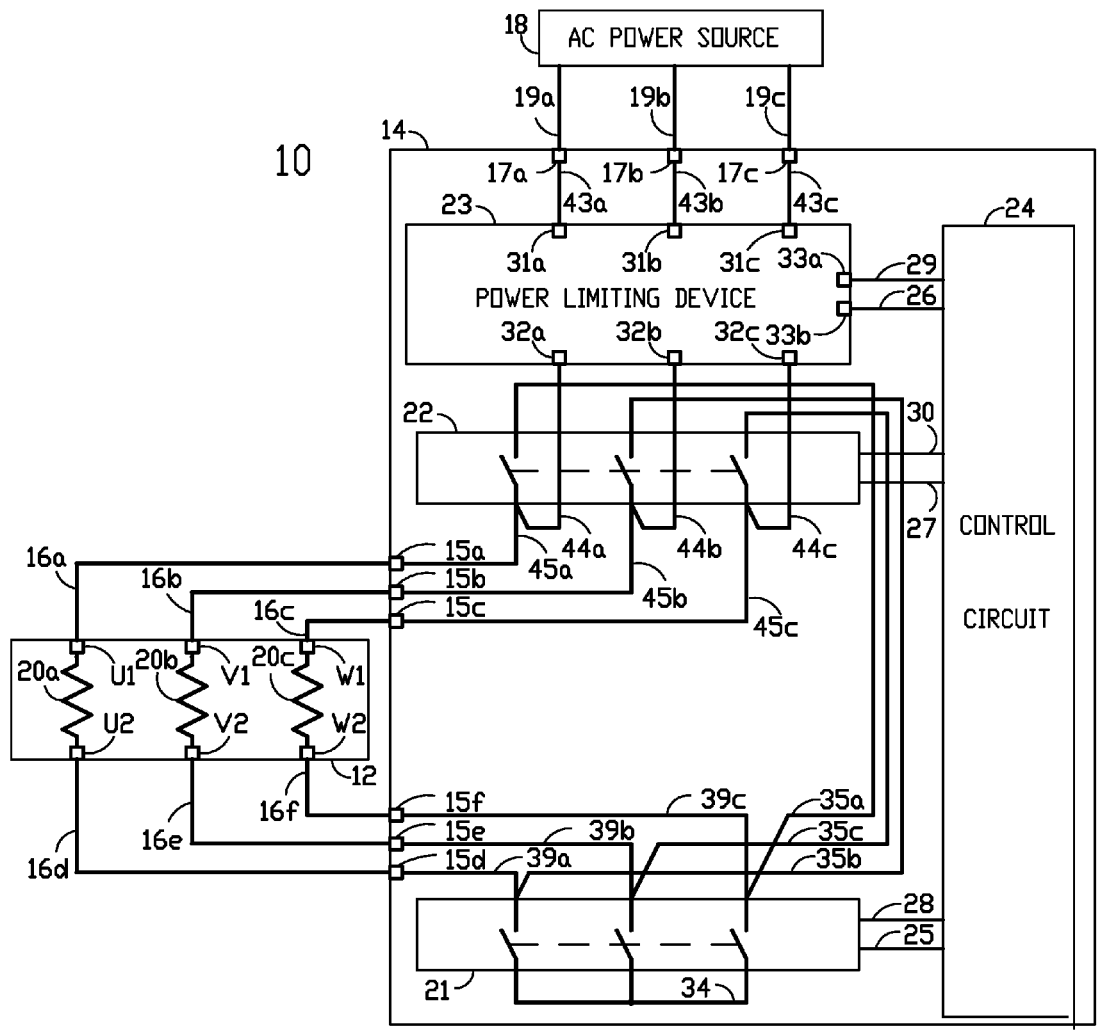

FIG. 1C illustrates a motor starting system with star-delta starter 14, where power-limiting device 23 is electrically positioned between input terminals of the starter 17a, 17b and 17c and contactor 22. Power conductor lines 39a, 39b and 39c connect output terminals 15d, 15e and 15f of the starter to the power contacts of contactor 21 on contrary side. Power conductor lines 43a, 43b and 43c connect input terminals 17a, 17b and 17c of the starter with first power terminals 31a, 31b and 31c of power-limiting device 23. Power conductor lines 44a, 44b and 44c connect second power terminals 32a, 32b and 32c of power-limiting device 23 with the power contacts of contactor 22 on contrary side. Power conductor lines 45a, 45b and 45c connect output terminals of the starter 15a, 15b and 15c with the power contacts of contactor 22 on contrary side.

Figure 1D:
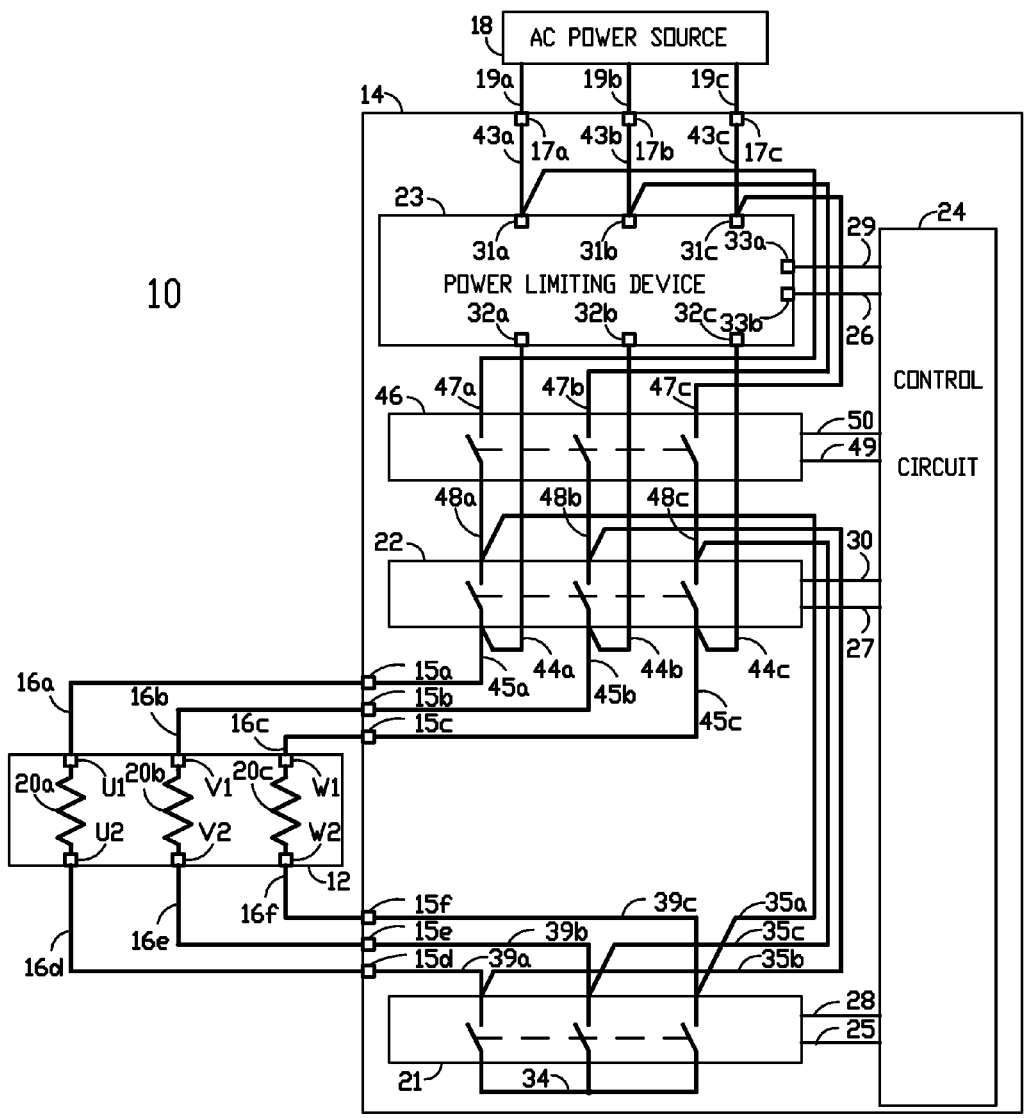

FIG. 1D illustrates a motor starting system with star-delta starter 14, which, as compared with the system shown on FIG. 1C, has supplementary contactor 46, which power contacts on contrary side connect by power conductor lines 47a, 47b and 47c with first power terminals 31a, 31b and 31c of power-limiting device 23 and by power conductor lines 48a, 48b and 48c with the power contacts of contactor 22 on one side. Lines 49 and 50 connect coil and signal contacts of contactor 46 to control circuit 24. Changing of closed position of contactors 22 and 46, changes place of power-limiting device 23: out of delta configuration of motor windings and within delta configuration. Thus, the changes of voltages supplied to the motor make additional step of voltage.

FIGS. 2A, 2B, 2C and 2D and FIG. 3 show realizations of power-limiting device 23.

Figure 2A:
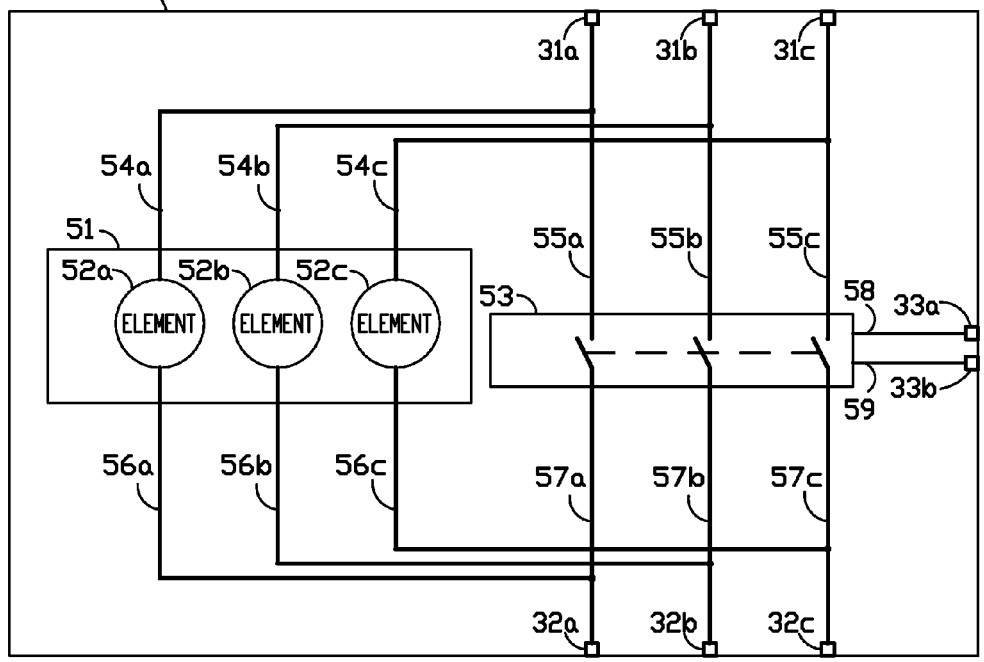
FIG. 2A is a circuit diagram of the power-limiting device with passive elements, FIGS. 2B, 2C and 2D, of star-delta multi-level starter, in accordance with embodiments of the invention.
Figure 2B:
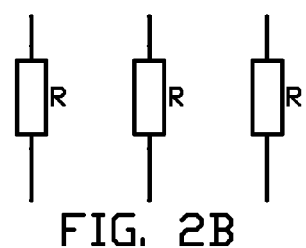
Figure 2D:
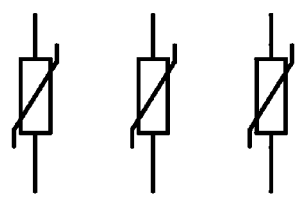
Figure 2C:
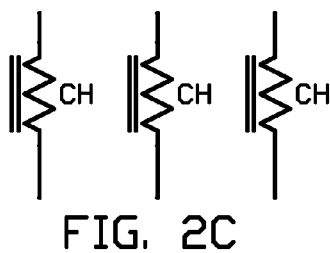

Power-limiting device 23 on scheme of FIG. 2A includes block 51 of passive electrical elements 52a, 52b and 52c and additional contactor 53. Elements 52a, 52b and 52c and power contacts of contactor 53 by lines 54a, 54b and 54c and 55a, 55b and 55c connect to first power terminals 31a, 31b and 31c and by lines 56a, 56b and 56c and 57a, 57b and 57c to second power terminals 32a, 32b and 32c of power-limiting device 23 correspondingly. Lines 58, 59 connected coil and signal contacts of contactor 53 to control terminals 33a and 33b. As passive elements, may be used resistors, FIG. 2B, chokes, FIG. 2C, capacitors, varistors, FIG. 2D, and SEDACtors, FIG. 2D.

Figure 3:
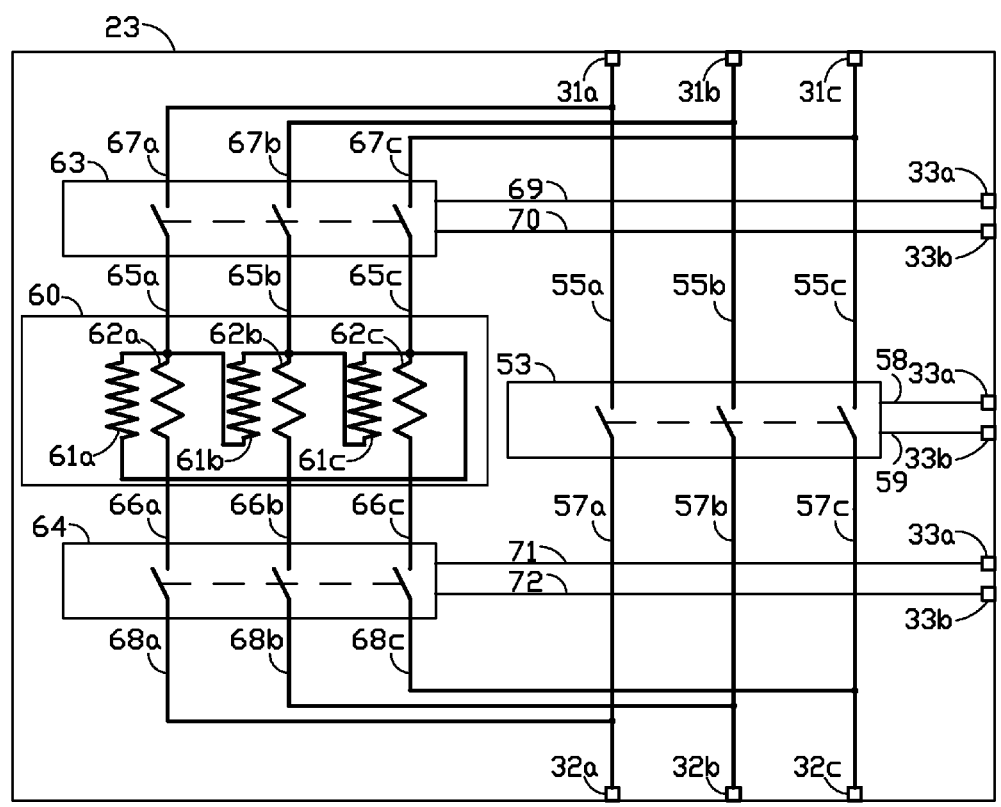
FIG. 3 is a circuit diagram of the power-limiting device with a three-phase transformer, in accordance with embodiments of the invention.

Power-limiting device 23 on FIG. 3 includes three-phase transformer 60 with primary 61a, 61b and 61c and secondary 62a, 62b and 62c windings and additional contactors 53, 63 and 64. Contactor 53 connects to first power terminals 31a, 31b and 31c and to second power terminals 32a, 32b and 32c of power-limiting device 23. Transformer 60 by lines 65a, 65b and 65c; and 66a, 66b and 66c connects to contactors 63 and 64 correspondingly. Contactor 63 by lines 67a, 67b and 67c connects to first power terminals 31a, 31b and 31c and contactor 64 by lines 68a, 68b and 68c connects to second power terminals 32a, 32b and 32c of power-limiting device 23. Lines 58, 59, 69, 70, 71 and 72 connect coils and signal contacts of contactors 53, 63 and 64 to control terminals 33a and 33b.

Contactors 63 and 64 are necessitated because of fact that without contactors 63 and 64 primary windings 61a, 61b and 61c are under voltage, when contactor 53 shorts secondary windings 62a, 62b and 62c.

Possible schemes of connection between primary 61a, 61b and 61c and secondary 62a, 62b and 62c windings of transformer 60 gives different value of voltage change by the transformer. This gives a path to regulate starting or slow stopping on stage of mounting starter 14 to motor 12.

Using schemes of FIGS. 2A, 2B, 2C and 2D, and FIG. 3 in power-limiting devices gives possibility to four power levels in the star-delta starters assembled in accordance with schemes of FIGS. 1A, 1B and 1C and five power levels in the star-delta starters assembled in accordance with scheme of FIG. 1D.

Figure 4A:
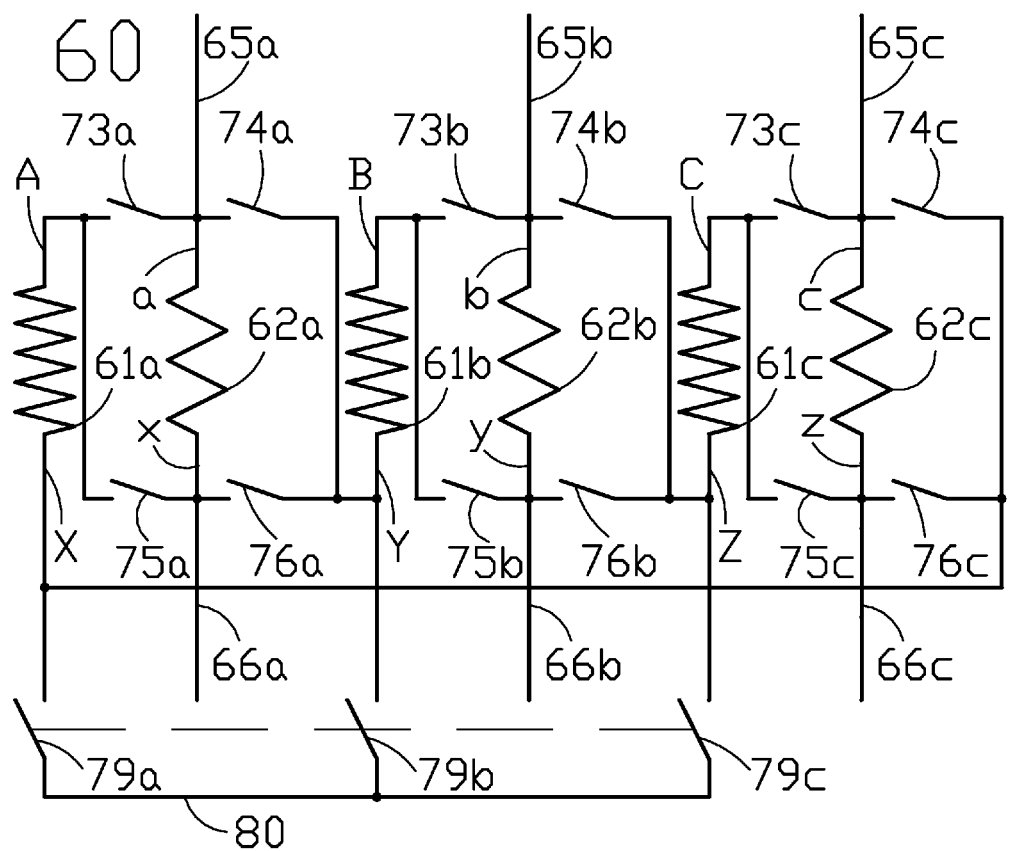
FIGS. 4A and 4B are circuit diagrams of transformers with regulated values of voltage, in accordance with embodiments of the invention.
Figure 4B:
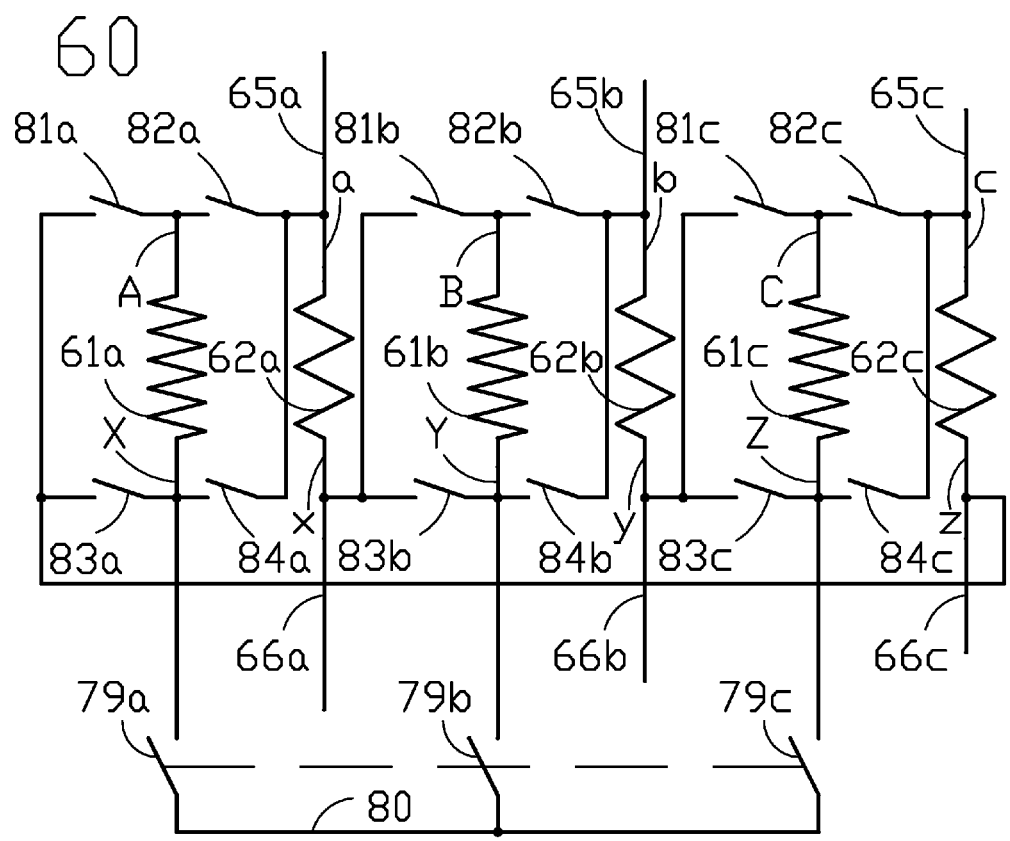

FIGS. 4A and 4B illustrate controlled connection of primary 61a, 61b and 61c and secondary 62a, 62b and 62c windings of transformer 60. The connection gives a possibility to regulate the value of variable voltages during starting or slow stopping. Transformer 60 uses five transformer contactors.

The realization, in accordance with FIG. 4A, has four transformer contactors 73, 74, 75 and 76 with their power contacts 73a, 73b and 73c; 74a, 74b and 74c; 75a, 75b and 75c; and 76a, 76b and 76c connected between the primary and the secondary phase windings. Contactors 73 and 74 may connect to beginning taps a, b and c and contactors 75 and 76 may connect to ending taps x, y and z of secondary windings 62a, 62b and 62c. Contactors 73 and 75 may connect to beginning taps A, B and C of primary windings of the same phase. Contactors 74 and 76 may connect to ending taps X, Y and Z of primary windings of the neighbor phase. It is possible to achieve all regarded connections of the transformer windings by closing pairs of contactors 73 and 74, 75 and 76, 73 and 76 or 74 and 75.

Secondary windings 62a, 62b and 62c of transformer 60 by lines 65a, 65b and 65c connect to first power terminals 31a, 31b and 31c and by lines 66a, 66b and 66c connect to second power terminals 32a, 32b and 32c of power-limiting device 23. Fifth contactor 79 with power contacts 79a, 79b and 79c connects on one side of power contacts to ending taps X, Y and Z of primary windings and on contrary side to power conductor 80. Contactor 79 permits to supply to primary winding of transformer 60 phase voltages in place of line voltage, if contactor 73 or 75 is closed and contactors 74 and 76 are opened, Only power contacts of contactors 73, 74, 75, 76 and 79 are shown on FIG. 4A.

Coils and signal contacts of contactors 73, 74, 75, 76 and 79 connect to control terminals 33a and 33b.

Scheme of transformer 60, shown on FIG. 4A, in power-limiting device without contactor 79 gives eight power levels in the star-delta starters, in accordance with schemes of FIGS. 1A, 1B and 1C, and eleven power levels in the star-delta starter, in accordance with scheme of FIG. 1D. With contactor 79 it is possible to produce twelve power levels in star-delta starters, in accordance with schemes of FIGS. 1A, 1B and 1C, and seventeen power levels in the star-delta starter, in accordance with scheme of FIG. 1D.

On FIG. 4B is shown transformer 60 with five transformer contactors 81, 82, 83, 84 and 79. Four transformer contactors 81, 82, 83 and 84 with their power contacts 81a, 81b and 81c; 82a, 82b and 82c; 83a, 83b and 83c; and 84a, 84b and 84c also may connect between the primary and the secondary windings. However, contactors 81 and 82 may connect to beginning taps A, B and C and contactors 83 and 84 may connect to ending taps X, Y and Z of primary windings 61a, 61b and 61c. Contactors 82 and 84 may connect to beginning taps a, b and c of the secondary windings of the same phase. Contactors 81 and 83 may connect to ending taps x, y and z of the secondary windings of the neighbor phase. It is possible closing pair of contactors 81 and 84 to decrease voltage and closing pair of contactors 82 and 83 to increase voltage. Other connections of power-limiting device 23 on FIG. 4B are similar to the connections on FIG. 4A.

Using transformer produced in accordance with scheme of FIG. 4B in power-limiting device gives eight power levels in the star-delta starters produced in accordance with schemes of FIGS. 1A, 1B and 1C and ten power levels in the star-delta starters produced in accordance with scheme of FIG. 1D.

Figure 5:
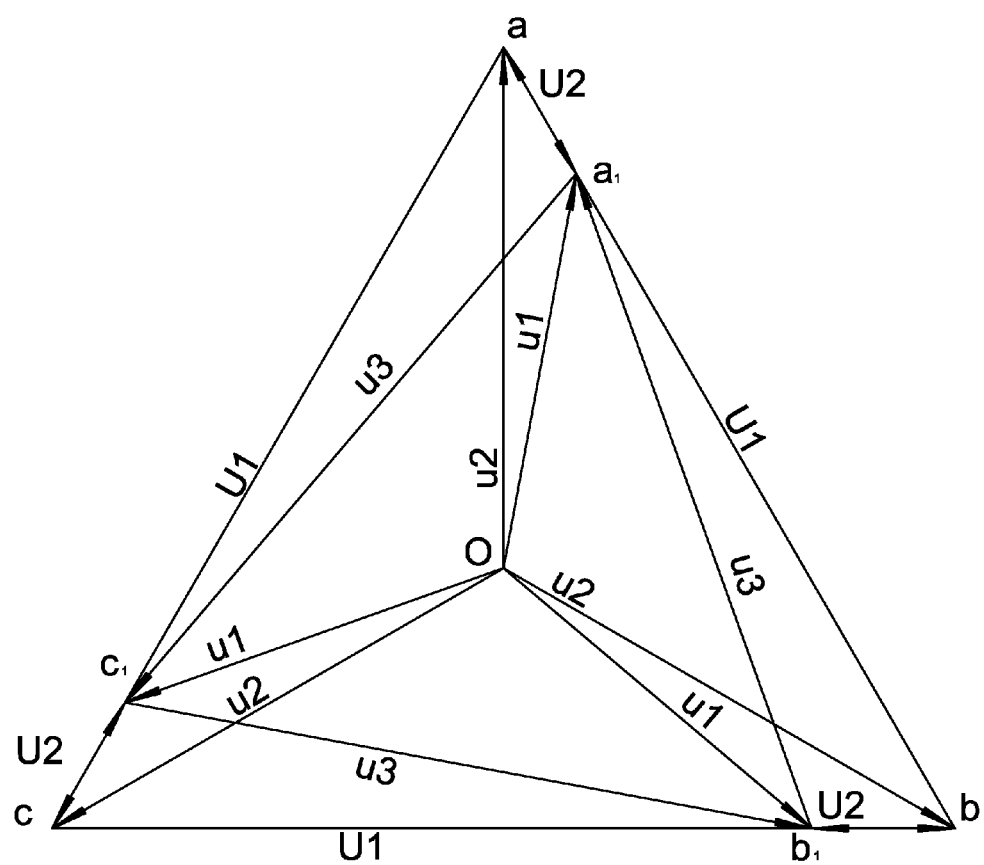
FIG. 5 is a vector diagram of voltage on motor windings when five levels star-delta starter is used, in accordance with an embodiment of the invention.

FIG. 5 illustrates a vector diagram graphing voltage on motor windings during five levels starting of the star-delta starter, assembled in accordance with the scheme of FIG. 1D. It is possible to select desired stepped changes of voltage by selecting a transformation ratio of the transformer. Formulas for approximate calculation of level voltages u1, u2, u3, u4 and u5, when the linear voltage of power source is equal U1 and the transformer ratio is equal U1/U2, is shown lower:

$$u1=\sqrt{U2^2+U1^2/3-U1*U2};$$

$$u2=U1/1.73;$$

$$u3=u1*1.73;$$

$$u4=U1-U2; \text{ and}$$

$$u5=U1.$$

Figure 6:
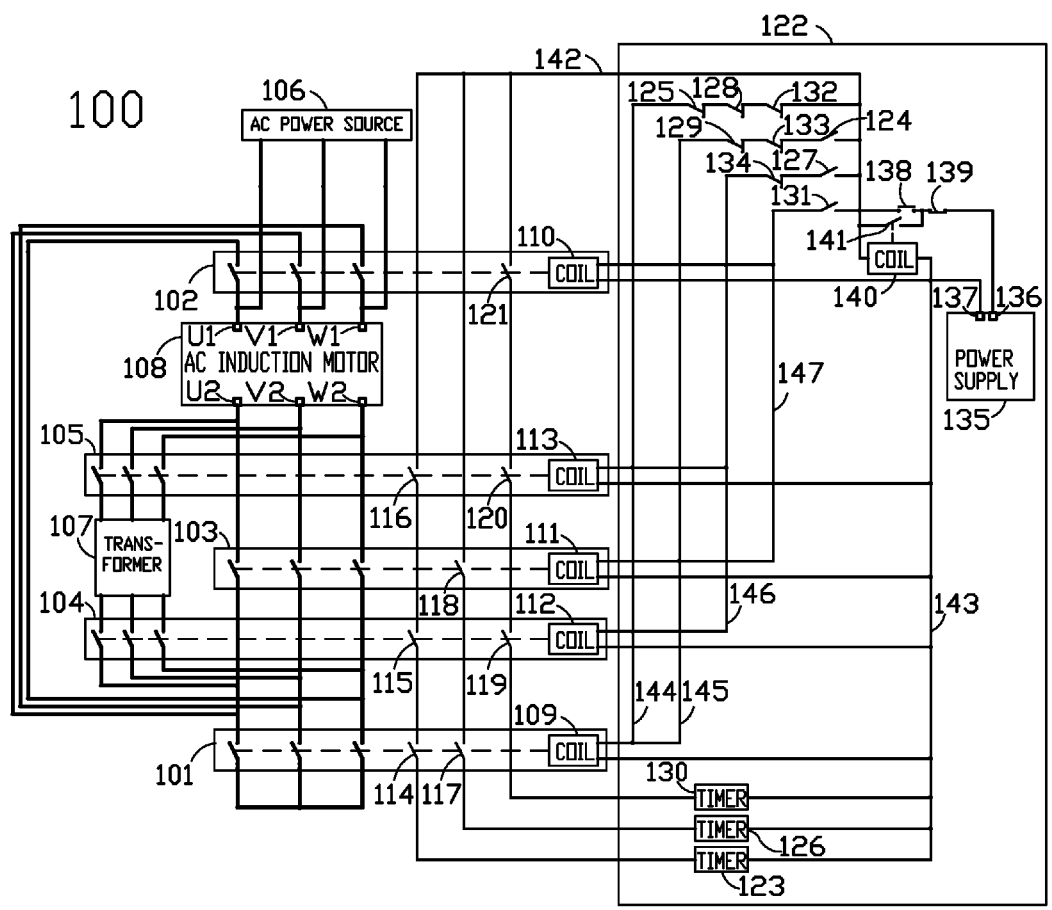
FIG. 6 is a circuit diagram of a motor system with the star-delta multi-level starter including the control circuit changing power levels in preset moments, in accordance with an embodiment of present invention.

FIG. 6 defines a realization of the control circuit of a motor starting system with the star-delta starter of the invention. There are four power levels of the motor received by configurations:

1. Series circuits of motor windings and secondary windings of a transformer are in star configuration and voltage is supplied to motor windings using the transformer.
2. Motor windings in star configuration and direct voltage supply to motor.
3. Series circuits of motor windings and secondary windings of the transformer are in delta configuration and voltage is supplied to motor windings using the transformer.
4. Motor windings in delta configuration and direct voltage supply.

Referring to FIG. 6, the motor systems with star-delta starter, in accordance with FIG. 1B, with transformer power-limiting device, in accordance with FIG. 3, are generally designated by the reference number 100. Five contactors 101, 102, 103, 104 and 105 are used for fulfilling four level starting. The voltage from an AC power source 106 is supplied using transformer 107 or without the transformer to an AC induction motor 108. Four levels of power received by motor are defined by position of contactors 101, 102, 103, 104 and 105:
1-st level—contactors 101 104 and 105 are closed;
2-nd level—contactors 101 and 103 are closed;
3-d level—contactors 102, 104 and 105 are closed; and
4-th level—contactors 102 and 103 are closed.

Contactors 101, 102, 103, 104 and 105 have coils 109, 110, 111 112 and 113, and signal contacts 114, 115, 116, 117, 118, 119, 120 and 121.

The control circuit 122 include a timer of the first power level 123 with an opened contact 124 and a closed contact 125; a timer of the second power level 126 with an opened contact 127 and closed contacts 128 and 129; and a timer of the third power level 130 with an opened contact 131 and closed contacts 132, 133 and 134.

Control circuit 122 also includes a control voltage source 135 with a phase output 136 and a neutral output 137; a START button 138; a STOP button 139; an interlocking relay with a coil 140 and an opened contact 141; and phase line 142 and neutral line 143. Opened contact 141 connects parallels to START button 138. Phase line 142 and neutral line 143 connect the voltage of source 135 to devices of the circuit for changing the power levels.

Phase line 142 connects phase output 136 of voltage source 135 to signal contacts 114, 115, 116, 117, 118, 119, 120 and 121 and to level control lines 144, 145, 146 and 147, defining power levels. Neutral line 143 connects neutral output 137 of voltage source 135 to coils 109, 110, 111, 112 and 113 of contactors 101, 102, 103, 104 and 105, timers 123, 126, 130 and interlocking relay 140. Level control lines 144, 145, 146 and 147 connect to coils of the combinations of contactors, closed position of which define power level. Level control line 144 and contacts 125, 128 and 132 are used for controlling contactors 101, 104 and 105. Level control line 145 and contacts 124, 129 and 133 are used for controlling contactors 101 and 103. Level control line 146 and contacts 127 and 134 are used for controlling contactors 102, 104 and 105. Level control line 147 and contact 131 are used for controlling contactors 102 and 103.

Starting of motor by system 100 fulfills in next order.

When START button 138 is pressed down, the potential of output 136 of control voltage source 135 through buttons 138 and 139, phase line 142, contacts 125, 128 and 132 and level control line 144 reaches coils 109, 112 and 113 and closes contactors 101, 104 and 105, realizing the first power level. Simultaneously, outputs 136 and 137 of control voltage source 135 connects to coil 140 of interlocking relay and closes contact 141. After START button 138 is released, contact 141 is used for transfer the control voltage in place of button 138.

When contactors 101, 104 and 105 are closed, the control voltage of source 135 through buttons 139 and 138, phase line 142, signal contacts 114, 115 and 116 and neutral line 143 reaches timer 123 defining time interval of the first power level. After this time interval is finished, contact 124 is closed, and contact 125 is opened. As result, contactors 104 and 105 are turned off, contractor 101 is left closed, and contactor 103 is closed. The first power level is changed to the second power level, and all actions are repeated for the second power level.

When contactors 101 and 103 are closed, the control voltage of source 135 through button 139, contact 141, phase line 142 and signal contacts 117 and 118 reaches timer 126 defining time interval of the second power level. After this time interval is finished, contact 127 is closed and contacts 128 and 129 are opened. As result, contactors 101 and 103 are turned off and contactors 102, 104 and 105 are closed. The second power level is changed to the third power level and all actions are repeated for the third power level.

When contactors 102, 104 and 105 are closed, the control voltage of source 135 through buttons 139, contact 141, phase line 142, signal contacts 119, 120 and 121 and neutral line 143 reaches timer 130 defining time interval of the third power level. After this time interval is finished, contact 131 is closed and contact 132 is opened. As result, contactors 104 and 105 are turned off, contactor 102 is left closed and contactor 103 is closed. The third power level is changed to the fourth power level.

Control of the starting is finished. After the fourth power level transient conditions the motor rotates at nominal conditions.

FIGS. 7A, 7B and 7C define realizations of the control circuit of a motor starting system including the star-delta multi-level starter of the invention with measuring effective voltage and effective current of the motor windings.

Four levels of power of the motor may be achieved by the system.

First level is achieved, when motor windings are in star configuration and voltage is supplied to motor with use of a transformer.

Second level is achieved, when motor windings are in star configuration and voltage is supplied to motor directly.

Third level is achieved, when motor windings are in delta configuration and voltage is supplied to motor with use of the transformer.

Forth level is achieved, when motor windings are in delta configuration and voltage is supplied to motor directly.

Power connections of the system are described in description of FIG. 1C. Further control circuit is described.

FIG. 7A illustrates a motor system with star-delta multi-level starter, in accordance with FIG. 1C, with transformer power-limiting device, in accordance with FIG. 3, is generally designated by the reference number 200. Five contactors 201, 202, 203, 204 and 205 are used for fulfilling four level starting. The voltage from an AC power source 206 is supplied through a transformer 207 or without transformer 207 to an AC induction motor 208. Four levels of power received by motor are defined by combination of positions of contactors 201, 202, 203, 204 and 205:
1-st level—contactors 201, 204 and 205 are closed;
2-nd level—contactors 201 and 203 are closed;
3-d level—contactors 202, 204 and 205 are closed; and
4-th level—contactor 202 and 203 are closed.

Contactors 201, 202, 203, 204 and 205 correspondingly have coils 209, 210, 211 212 and 213 and signal contacts 214, 215, 216, 217 and 218.

Unnumbered lines on circuit diagram, FIG. 7A, interring into control circuit 219 are continuing on FIGS. 7B and 7C in the same order from top to bottom.

Control circuit 219 for starting, FIG. 7B, and for slow stopping, FIG. 7C, includes a sensor of effective voltage on the motor winding 220 and a sensor of effective current through the motor winding 221; a differentiator of the voltage 222 and a differentiator of the current 223; a comparator of the voltage change speed 224 with a preset device 225 and a comparator of the current change speed 226 with a preset device 227; a coil of a first zero-relay of the voltage change speed 228 with a closed contact 229 and an opened contact 230; a coil of a second zero-relay of the current change speed 231 with its closed contacts 232, 233 and 234.

Sensor of the voltage 220, differentiator of the voltage 222, comparator of the voltage change speed 224 and coil of first zero-relay of the voltage change speed 228 are connected in series. Sensor of effective current 221, differentiator of the current 223, and comparator of the current change speed 226, closed contact 229 and coil of second zero-relay of the current change speed 231 also are connected in series. Devices and elements of positions 220-231 make the moment defining circuit for defining moments of switching of the power levels.

Control circuit 219 also includes AND gates 235, 236 and 237; level relay of the second power level with a coil 238, a closed contact 239 and opened contacts 240 and 241; level relay of the third power level with a coil 242, closed contacts 243, 244 and 245 and opened contacts 246 and 247; level relay of the fourth power level with a coil 248, closed contacts 249, 250, 251, 252, 253 and 254 and opened contacts 255 and 256; a START button 257; a STOP button 258; a control voltage source 259 with a phase output 260 and a neutral output 261; level control lines 262, 263, 264 and 265 for control the power levels; contactor position lines 266, 267, 268, 269 and 270 for information of contactors position; phase lines 271, 272 and neutral line 273 to supply the control voltage to elements of the control circuit; and an interlocking relay with a coil 274 and an opened contact 275.

Phase line 271 is utilized for supplying the control voltage to coils and signal contacts of contactors 201, 202, 203, 204 and 205. Phase line 272 is utilized for supplying the control voltage to coil of second zero-relay of the current change speed 231 through contact 230. Neutral line 273 is utilized for connecting all coils of the contactors and the relays to neutral output 261 of control voltage source 259.

Level control lines 262, 263, 264 and 265 together with contacts tied in with coils 238, 242 and 248 form circuits to control combinations of contactors making the first, the second, the third and the fourth power levels. For controlling contactors 201, 204 and 205 is used level control line 262 connected to phase line 271 through connected in series contacts 239, 243 and 249. For controlling contactors 201 and 203 is used level control line 263 connected to phase line 271 through connected in series contacts 240, 244 and 250. For controlling contactors 202, 204 and 205 is used level control line 264 connected to phase line 271 through connected in series contacts 246 and 251. For controlling contactors 202 and 203 is used level control line 265 connected to phase line 271 through contact 255.

The control voltage controllably comes to coils 238, 242 and 248 from outputs of AND gates 235, 236 and 237 through contacts 232, 233 and 234 or from phase line 272 through contacts 241, 247 and 256. Information about closed contactors according to combinations of contactors, closed positions of which define the power level, reaches AND gates 235, 236 and 237 through contactor position lines 266, 267, 268, 269 and 270 from closed contact of contact 214, 215, 216, 217 and 218. Thus, output of only one of AND gates 235, 236 and 237 is turned on. This is the AND gate of the power level of the present situation. The output potential of the AND gate is equal to the potential of the phase output the control voltage source.

Elements 209-214, 232-256 and 262-270 of scheme of FIG. 7B provide the level changing circuit for starting.

Starting of the motor by control circuit 219, FIG. 7B, fulfills in next order.

When START button 257 is pushed down, the phase potential from output 260 of voltage source 259 through STOP button 258, START button 257, phase line 271, contacts 239, 243 and 249, level control line 262 reaches coils 209, 212 and 213 of contactors 201, 204 and 205 defining the first power level. The contactors are closed.

Simultaneously the phase potential from output 260 of voltage source 259 reaches coil 274 of interlocking relay and contact 275 is closed. After START button 257 is released, closed contact 275 is used in place of START button 257 for connecting phase lines 271 and 272 to phase output 260 of control voltage source 259.

The voltage, which is measured by sensor 220, after a differentiation in differentiator 222 and a comparison with a preset value of the change speed of the voltage in comparator 224, forms, as a result of large change speed of the voltage, on output of comparator 224 voltages, which turn on coil 228 of first zero-relay of the voltage change speed. Coil 228 turned on opens contact 229 and closes contact 230. The potential of output 260 of control voltage through phase line 272 and contact 230 reaches coil 231 of second zero-relay of the current change speed and turns coil 231 on. Contacts 232, 233 and 234 are opened, and AND gates 235, 236 and 237 and coils 238, 242 and 248 are disconnected.

When contactors 201, 204 and 205 are closed, signal contacts 214, 217 and 218 also are closed. The potential of output 260 of control voltage source 259 by contactor position lines 267, 269 and 270 reaches AND gate 235. It is important that between the moment, when this potential reaches the inputs of AND gate, and the moment, when the output of AND gate is turned on, will be a delay. Thereby achieving that the output will be turned on after AND gates 235, 236 and 237 and coils 238, 242 and 248 are disconnected by coil 231, which turns on and in such position opens contacts 232, 233 and 234.

After some time, voltage of the first power level nears its maximum value. The voltage change speed nears zero. Output of comparator 224 is low. Coil 228 is turned off returning contact 229 and contact 230 to initial positions. Control on coil 231 transmits to output of comparator 226. When the absolute value of the change speed of the voltage is low, the absolute value of the change speed of the current is so large that coil 231 remains in the on position. The absolute value of the change speed of the current decreases during time, coil 231 is turned off, and contacts 232, 233 and 234 return to initial positions. Next, the high potential of output of AND gate 235 through contact 232 reaches coil 238, turns it on, opens contact 239 and closes contact 240 and contact 241.

Output 260 of control voltage source 259 disconnects from level control line 262 because of opening contact 239 and through contacts 240, 244 and 250 is connected to level control line 263, which connects to coils 209 and 211. Coil 238 through contact 241 connects to phase line 272. As result, contactors 204 and 205 are released, contractor 201 is left closed and contactor 203 is closed.

The second power level begins and the previous actions are repeated for the second power level.

The voltage, which is measured by sensor 220, after the differentiation in differentiator 222 and the comparison with the preset value of the change speed of the voltage in comparator 224, forms, as a result of large change speed of the voltage, on output of comparator 224 voltages, which turn on coil 228 of first zero-relay of the voltage change speed. Coil 228 turns on, opens contact 229 and closes contact 230. The potential of output 260 of control voltage through phase line 272 and contact 230 reaches coil 231 of second zero-relay of the current change speed and turns coil 231 on, Contacts 232, 233 and 234 are opened, and AND gates 235, 236 and 237 and coils 238, 242 and 248 are disconnected.

When contactors 201 and 203 are closed, signal contacts 214 and 216 also are closed. The potential of output 260 of control voltage source 259 by contactor position lines 266 and 267 reaches AND gate 236 and turns output of AND gate 236 on.

When values of the change speed of the voltage and of the output voltage of comparator 224 become low, coil 228 is turned off returning contact 229 and contact 230 to initial positions. Control on coil 231 transmits to output of comparator 226. When the absolute value of the change speed of the voltage is low, the absolute value of the change speed of the current is so large that coil 231 remains in the on position. The absolute value of the change speed of the current decreases during time, coil 231 is turned off, and contacts 232, 233 and 234 return to initial positions. High potential of output of AND gate 236 through contact 233 reaches coil 242, turns coil 242 on, opens contacts 243, 244 and 245 and closes contacts 246 and 247. Opening contacts 243 and 244 disconnects level control lines 262 and 263 and opening contact 245 disconnects coil 238 from control voltage source 259.

Output 260 of control voltage source 259 through contact 246 and contact 251 connects to level control line 264, which connects to coils 209, 212 and 213. As result contactors 201 and 203 are released and contactors 202, 204 and 205 are closed.

The third power level begins and the previous actions are repeated for the third power level:
The voltage, which is measured by sensor 220, after the differentiation in differentiator 222 and the comparison with the preset value of the change speed of the voltage in comparator 224, forms, as a result of large change speed of the voltage, on output of comparator 224 voltages, which turn on coil 228 of first zero-relay of the voltage change speed. Coil 228 turned on opens contact 229 and closes contact 230. The potential of output 260 of control voltage source 259 through phase line 272 and contact 230 reaches coil 231 of second zero-relay of the current change speed and turns coil 231 on. Contacts 232, 233 and 234 are opened; AND gates 235, 236 and 237 and coils 238, 242 and 248 are disconnected. Coil 242 through closed contact 247 connects to phase line 272.

When contactors 202, 204 and 205 are closed, signal contacts 215, 217 and 218 also are closed. The potential of output 260 of control voltage source 259 by contactor position lines 268, 269 and 270 reaches AND gate 237 and turns output of AND gate 237 on.

When voltage of third power level almost reaches its maximum value the change speed of the voltage and output voltage of comparator 224 becomes low. Coil 228 is turned off returning contact 229 and contact 230 to initial positions. Control on coil 231 transmits to output of comparator 226. When the absolute value of the change speed of the voltage is low, the absolute value of the change speed of the current is so large that coil 231 remains in the on position. The absolute value of the change speed of the current decreases during time, coil 231 is turned off, and contacts 232, 233 and 234 return to initial positions. High potential of output of AND gate 237 through contact 234 reaches coil 248, turns coil 248 on, opens contacts 249, 250, 251, 252, 253 and 254 and closes contact 255. Opening contacts 249, 250 and 251 disconnects level control lines 262, 263 and 264; and opening contacts 252, 253 and 254 disconnects coils 242, 231 and 228 from control voltage source 259.

Output 260 of control voltage source 259 disconnected from level control line 264 through contact 255 connects to level control line 265, which connects to coils 210 and 211. As result contactors 204 and 205 are released, contactor 202 is left closed and contactor 203 is closed.

The fourth power level begins. Control of starting is finished. After transient conditions of the fourth power level, the motor rotates at nominal conditions.

Control circuit 219, shown on FIG. 7C, has additional possibility to fulfill slow stopping. The possibility is provided by utilization of addition devices. The reference numbers of components till number 275 on FIG. 7C are the same that on FIG. 7B.

Control circuit 219 of FIG. 7C additionally includes a SLOW STOP button 276; a slow stop interlocking relay with an opened contact 277 and a coil 278; a first slow stop control relay with a coil 279, closed contacts 280, 281, 282 and 283 and opened contacts 284, 285, 286 and 287; a second slow stop control relay with a coil 288, closed contacts 289, 290, 291 and 292 and opened contacts 293, 294 and 295; a slow stop finishing relay with a coil 296 and a closed contact 297; and a level relay of the first power level with a coil 298, closed contacts 299, 300 and 302 and opened contacts 303 and 304. The level relays of the second and the third power levels have additional closed contacts. Coil 238 interconnects with closed contact 305; coil 242 interconnects with closed contact 306. Coil 231 of second zero-relay of the current change speed interconnects with additional closed contacts 301 and 307. Opened contact 277 connects in parallel with SLOW STOP button 276.

Slow stopping of an AC induction motor necessitates decrement changing of power levels, when the absolute value of the change speed of the current is decreasing and nears zero. For changing the power level, it is necessary to turn on level relay of the level a step lower than now in use power level.

When SLOW STOP button 276 is pressed, output 260 of control voltage source 259 connects to coil 278 of interlocking relay closing contact 277. Output 260 of control voltage source 259 during slow stopping connects through contact 277 coil 279 and coil 288 of the slow stop control relays.

Before pressing SLOW STOP button 276, coil 248 is turned on. When coil 248 is turned on, contact 255 is closed and level control line 265 connects to output 260 of control voltage source 259. Contactors 202 and 203 are closed.
After pressing and releasing SLOW STOP button 276, contact 292 is opened, coil 248 is turned off, and contact 255 and contact 256 are opened. Output 260 of control voltage source 259 disconnects from level control line 265 and coil 248.

The potential of output 260 of control voltage source 259 through contact 287, closed by coil 279, and closed contact 306 reaches coil 242 and turns coil 242 on. Contact 247 is closed and output 260 of control voltage source 259 through contacts 295, 305 and 247 connects to coil 242 opening contact 306 interconnected with coil 242. Thus, output 260 of control voltage source 259 connects to coil 242 only through contacts 295, 305 and 247.

When coil 242 is turned on, contact 246 is closed and level control line 264 connects to output 260 of control voltage source 259. Contactors 202, 204 and 205 are closed.

First step of slow stopping begins: the fourth power level is changed to the third power level.
The voltage, which is measured by sensor 220, after the differentiation in differentiator 222 and the comparison with the preset value of the change speed of the voltage by comparator 224, forms, as a result of large change speed of the voltage, on output of comparator 224 voltages, which turn on coil 228 of first zero-relay of the voltage change speed. Coil 228 turned on opens contact 229 and closes contact 230. The potential of output 260 of control voltage source 259 through phase line 272 and contact 230 reaches coil 231 of second zero-relay of the current change speed and turns coil 231 on. Contacts 232, 233, 234, 301 and 307 are opened, and outputs of the AND gates disconnect from coils of the level relays.

When contactors 202, 204 and 205 are closed, signal contacts 215, 217 and 218 also are closed. The output 260 of control voltage source 259 by contactor position lines 268, 269 and 270 connects to AND gate 237 and turns on the output of AND gate 237.

When voltage of the third power level nears its minimum value, the absolute value of the change speed of the voltage and the output'voltage of comparator 224 become low. Coil 228 is turned off returning contact 229 and contact 230 to initial positions. By this action control on coil 231 transmits to output of comparator 226. When the absolute value of the change speed of the voltage is low, the absolute value of the change speed of the current is so large that coil 231 remains in the on position. The absolute value of the change speed of the current decreases during time, coil 231 is turned off, and contacts 232, 233, 234, 301 and 307 return to initial positions.

High potential of output of AND gate 237 transmits through contacts 286 and 232 to coil 238, turns coil 238 on, closes contact 241, opens contact 305 disconnecting output 260 of control voltage source 259 from coil 242 and opens contact 246 disconnecting output 260 of control voltage source 259 from level control line 264. Output 260 of control voltage source 259 through closed contact 294, closed contact 302 and closed contact 241 connects to coil 238.

When coil 238 is turned on, contact 240 is closed, and level control line 263 connects to output 260 of control voltage source 259. Contactors 201 and 203 are closed.

Second step of slow stopping begins, the third power level is changed to the second power level and the previous actions of the moment defining circuit are repeated.

The voltage, which is measured by sensor 220, after the differentiation in differentiator 222 and the comparison with the preset value of the change speed of the voltage by comparator 224, forms, as a result of large change speed of the voltage, on output of comparator 224 voltages, which turn on coil 228 of first zero-relay of the voltage change speed. Coil 228 turned on opens contact 229 and closes contact 230. The potential of output 260 of control voltage source 259 through phase line 272 and contact 230 reaches coil 231 of second zero-relay of the current change speed and turns coil 231 on. Contacts 232, 233, 234, 301 and 307 are opened. As result, of position of these contacts, AND gates are disconnected from coils of the level relays. After opening contact 232, output 260 of control voltage source 259 connects to coil 238 only through contacts 294, 302 and 241.

When contactors 201 and 203 are closed, signal contacts 214 and 216 also are closed. The potential of output 260 of control voltage source 259 by contactor position lines 266 and 267 reaches AND gate 236 and turns on the output of AND gate 236.

When the voltage of the second power level nears its minimum value, the absolute value of the change speed of the voltage and of the output voltage of comparator 224 become low. Coil 228 is turn off returning contact 229 and contact 230 to initial positions. By this action control on coil 231 transmits to output of comparator 226. When the absolute value of change speed of the voltage is low, the absolute value of the change speed of the current is so large that coil 231 remains in the on position. The absolute value of the change speed of the current decreases during time, coil 231 is turned off, and contacts 232, 233, 234, 301 and 307 are returned to initial positions.

High potential of output of AND gate 236 goes through contacts 285 and 302 to coil 298, turns coil 298 on, closes contacts 305, opens contact 302 disconnecting output 260 of control voltage source 259 from coil 238. Then contact 240 is opened and output 260 of control voltage source 259 disconnects from level control line 263.

When coil 298 is turned on, contact 303 is closed and level control line 262 connects to output 260 of control voltage source 259. Contactors 201, 204 and 205 are closed.

Third step of slow stopping begins, the second power level is changed to the first power level and the previous actions of the moment defining circuit are repeated.

The voltage, which is measured by sensor 220, after the differentiation in differentiator 222 and the comparison with the preset value of the change speed of the voltage by comparator 224, forms, as a result of large change speed of the voltage, on output of comparator 224 voltages, which turn on coil 228 of first zero-relay of the voltage change speed. Coil 228 turned on opens contact 229 and closes contact 230. The potential of output 260 of control voltage source 259 through phase line 272 and contact 230 reaches coil 231 of second zero-relay of the current change speed and turns coil 231 on. Contacts 232, 233, 234, 301 and 307 are opened, and AND gates are disconnected from the coils of the level relays. After opening contact 301, output 260 of control voltage source 259 connects to coil 298 through contacts 293 and 304.

When contactors 201, 204 and 205 are closed, signal contacts 214, 217 and 218 also are closed. The potential of output 260 of control voltage source 259 by contactor position lines 267, 269 and 270 reaches AND gate 235 and turns on the output of AND gate 235.

When voltage of the first power level nears its minimum value, the absolute value of the change speed of the voltage and the output voltage of comparator 224 become low. Coil 228 turns off returning contact 229 and contact 230 to initial positions. By this action control on coil 231 transmits to output of comparator 226. When the absolute value of the change speed of the voltage is low, the absolute value of the change speed of the current is so large that coil 231 remains in the on position. The absolute value of the change speed of the current decreases during time, coil 231 is turned off returning contacts 232, 233, 234, 301 and 307 to initial position.

High potential of output of AND gate 235 goes through contacts 284 and 307 to coil 296 of slow stop finishing relay, turns the slow stop finishing relay on, opens contact 297, disconnecting output 260 of control voltage source 259 from components of control circuit 219. All contactors are opened. Control of slow stopping of the motor is finished.

It is necessary to emphasize that addition of coil 298 of level relay of first power level and opened contact 303 for fulfilling slow stopping introduces some changes in fulfilling starting. After pressing on START button 257, output 260 of control voltage source 259 through closed contact 280 and closed contact 299 connects to coil 298 and turns coil 298 on, closing contact 303, which connects output 260 of control voltage source 259 to level control line 262 of the first power level.

When the first power level is changed on the second power level coil 238 is turned on and opens contact 300. Coil 298 is turned off and level control line 262 of the first power level disconnects from output 260 of control voltage source 259.

So, increasing number of steps and automation of selecting time intervals between their changes permit to achieve quality of starting and stopping of the star-delta multi-level starter comparable to quality of a soft starter. This fact will permit to use the star-delta multi-level starter as a star-delta soft starter.

The functions of the control circuit are described as being implemented in hardware. It is contemplated that the functions could be implemented in software, as well as, in a combination of hardware and software, if a programmable logic controller or a circuit with microprocessor will be used as the control circuit.

It should be emphasized that the above-described embodiments of the present invention, particularly "preferred" embodiments, are merely possible examples of implementations, merely set forth for a clear understanding of the principles of the invention. Many variations and modifications may be made to the above-described embodiments of the invention without departing substantially from the spirit and principles of the invention. In particular, it is concern modifications of possible replacement of contactors with another type of two positions "ON-OFF" controlled switches.

Various modes of carrying out the invention are contemplated as being within the scope of the present invention claims particularly pointing out and distinctly claiming the subject matter, which is regarded as the invention.

What is claimed is:

1. A star-delta multi-level starter for an AC induction motor, said induction motor having phase motor windings having beginning taps and ending saps, wherein said starter comprising:
   a. a three-phase electric power circuit comprising:
      i. input terminals for connecting to an AC power source;
      ii. output terminals for connecting to said beginning taps of said motor windings and for connecting to said ending taps of said motor windings, for providing a motor system,
      iii. a plurality of three-phase contactors comprising power contacts, a coil and a signal contact, said contactors each having an opened position and a closed position;
      iv. a three-phase power limiting device adapted to change the power supplied to said windings of said induction motor;
   b. a control circuit, adapted to control said positions of said contactors, monitor parameters of said motor, and change positions of said contactors in accordance with said parameters of said motor;
wherein said multi-level starter allows for multiple levels of motor power consumption, by controlling said positions of said contactors by means of said control circuit.

2. The star-delta multi-level starter of claim 1, wherein each phase of said three-phase power limiting device comprises at least one element adapted to be switched into series with said windings by means of said three-phase contactors, and wherein said three-phase power circuit being structured in circuits having distinct configurations comprising:
   a. a star configuration;
   b. at least one delta configuration.

3. The star-delta multi-level starter of claim 1, wherein said power-limiting device comprises identical elements in each phase selected from the list consisting of: resistor, choke, capacitor, varistor, SIDACtor, transformer, said elements having constant properties or controllably changeable properties; said element being optionally bypassed by means of at least one of said contactors.

4. The star-delta multi-level starter of claim 2, wherein said control circuit comprises:
   a. a moment defining circuit adapted to determine desired moments for changing power levels of said motor, said moment defining circuit adapted to identify transition conditions based on said monitored parameters of said motor and comparisons with predetermined values;
   b. a level changing circuit connected to the coils for sequentially changing power levels delivered to said motor,
wherein said level changing circuit is controlled by said moment defining circuit.

5. The star-delta multi-level starter of claim 3 wherein said power limiting device comprises varistor or SIDACtor; and further wherein said element provides means of modulation of voltage on said motor winding.

6. The star-delta multi-level starter of claim 3, wherein said power-limiting device comprises:
   a. a three-phase transformer having a primary winding and a secondary winding in each phase;
   b. three additional three-phase contactors;
wherein the element of any phase is provided by said primary winding and said secondary winding of the phase, where said phase secondary winding uses as a voltage source element of said phase and said phase primary winding uses as a power source of said voltage source element; and further wherein said transformer is connected to or disconnected from said three-phase power circuit by means of two contactors when it is needed to include or bypass said transformer.

7. The star-delta multi-level starter of claims 6, wherein said power-limiting device with changeable properties of said element further comprises:
   five or fewer three-phase transformer contactors with taps of coils and signal contacts of said transformer contactors also connected to said control circuit, four of said transformer contactors being connected in pairs with said power contacts on one side to the beginning and ending taps of the secondary windings; and on the opposite side of the power contacts, one pair of the four contactors, one from each end of the secondary windings, are connected to beginning taps of said primary windings of the same phase; another pair of the four contactors, also one from each end of said secondary windings, are connected to ending taps of said primary windings of the neighbor phase;
   and a fifth transformer contactor connects with power contacts on one side to ending taps of said primary windings, and on the opposite side, to a common wire.

8. The star-delta multi-level starter of claim 4, wherein said level changing circuit comprises:
   a plurality of relays adapted for controlling power levels by means of controlling level combinations of said contactors, said relays operated by means of logic gates operating upon desired and actual power levels;
   a plurality of level control lines for sequent realization of said level combinations by actuating said coils, in accordance with sequence of actuated power levels;
   contactor position lines connect to said signal contacts for transmitting information about positions of the three-phase contactors;
   AND gates of the power levels for controlling said realized level combinations by controlling positions of signal contacts of the three-phase contactors by means of said contactor position lines;
   a START button 257 for initiating increasing levels of motor power consumption;
   a STOP button 258 for stopping said motor by disconnecting said motor from said AC power source;
   an interlocking relay with a coil and an opened contact;
   a control voltage source with a phase output and a neutral output for supplying control voltage to said moment defining circuit and said level changing circuit.

9. The star-delta multi-level starter of claim 8, further comprising said START button and said STOP button being connected in series and said contact of said interlocking relay connected in parallel to said START button, said series circuit with end of said STOP button connecting to said phase output of said control voltage source and with end of START button to said phase line;
   said neutral output of the control voltage source connects to said neutral line;
   said coil of said interlocking relay connects to said phase line and to said neutral line.

10. The star-delta multi-level starter of claim 8, wherein said moment defining circuit comprises:
   a first sensor of effective voltage;

a second sensor of a parameter selected from the list consisting of: current through said motor windings; speed of motor rotation; and motor power;
a first differentiator for determining rate of change of voltage;
a second differentiator for defining rate of change of another parameter;
a first comparator for comparing the rate of change of voltage and a preset voltage change speed;
a second comparator for comparing the rate of change of said parameter and a preset rate of change of said parameter;
a first preset device for introducing a preset rate of change of voltage;
a second preset device for introducing a preset rate of change of said parameter;
a first zero-relay of the rate of change of said voltage with a coil, a closed contact and an opened contact; and
a second zero-relay of the rate of change of said parameter with a coil and closed contacts destined to actuate changing of the power levels in initial positions of said closed contacts, and having subsequent connections between said devices:
said first sensor, first differentiator and first comparator being connected in series, said output of said first comparator connecting to a tap of said coil of said first zero-relay;
said second sensor, second differentiator and second comparator being connected in series; an output of said second comparator connecting to a tap of said coil of said second zero-relay through said closed contact of said first zero-relay;
said first preset device being connected to said first comparator;
said second preset device being connected to said second comparator;
said phase line connecting to a tap of said coil of said second zero-relay through said opened contact of said first zero-relay; and,
said neutral line connecting to another tap of said coils of both zero-relays.

11. The star-delta multi-level starter of claim 8, wherein said connections in said level changing circuit for changing the power levels during the starting of said motor comprise, for every level relay:
a connection with one of said taps of said coil of said level relay to output of said AND gates of the previous power level through said contacts of said second zero-relay;
a connection of the opposite tap of said coil of said level relay through one of said closed contacts of said level relay of the subsequent power level to said neutral line;
a connection of tap of said coil of said previous level relay connected to one of said contacts of said second zero-relay, to said phase line through one of said opened contacts of said level relay; and
a connection of contacts of said level relays in a series circuit attached between said corresponding level control line and said phase line.

12. The star-delta multi-level starter of claim 8, wherein said connections between said level changing circuit and said coils of said three-phase contactors for changing the power levels comprise:
connections for every selected power level between one of said taps of said coils of said three-phase contactors, determining in their closed positions the power levels, and said level control lines of the power level; and
connections between opposite taps of said coils and said neutral line.

13. The star-delta multi-level starter of claim 8, wherein said connections between said level changing circuit and said signal contacts comprise:
connections of said signal contacts of said three-phase contactors on one side to said phase line, and on opposing side to one side of said contactor position lines; and
connections, for every AND gate, of inputs of said AND gate of any power level with opposite side of said contactor position lines connected from one side to said three-phase contactors defining in its closed position the same power level.

14. The star-delta multi-level starter of claim 8, wherein said level changing circuit for starting and slow stopping additionally comprises:
first and second slow stop control relays comprising coils, opened contacts and closed contacts;
a SLOW STOP button for initiation slow stopping by step decreasing levels of motor power consumption;
a slow stop interlocking relay with opened contact;
a level relay of first power level comprising a coil, opened contacts and closed contacts;
a slow stop finishing relay, which acts as level relay of zero power level, with a coil and a closed contact;
an additional closed contact in each of said level relays for power levels from the second power level till the penultimate power level;
additional closed contacts of said second zero relay;
connections for connections in said level changing circuit for fulfilling the slow stopping;
connections for initiating starting and slow stopping; and
connections for changing the power levels during starting and slow stopping.

15. The star-delta multi-level starter of claim 14, wherein said connections in said level changing circuit for fulfilling the slow stopping additionally comprise:
said series circuit with said START button and said STOP button including said closed contact of said finishing relay connected in series with said START button and said STOP button;
a slow stop voltage lead connecting together one side of said SLOW STOP button and said opened contact of said slow stop interlocking relay attached with contrary sides to said phase line; and
said slow stop voltage lead being connected together with said neutral line to taps of said coils of said slow stop interlocking relay, said first slow stop control relay and said second slow stop control relay.

16. The star-delta multi-level starter of claim 14, wherein said connections in the level changing circuit for initiating starting and slow stopping comprise:
a connection for beginning the starting between said phase line and first tap of said coil of said level relay of the first power level, through a series circuit of closed contact of said first slow stop control relay and closed contact of said level relay of the first power level; and
a connection for beginning the slow stopping between said phase line and first tap of coil of said level relay of power level previous to the maximum power level by a series circuit of opened contacts of the first slow stop control relay and closed contact of level relay of power level previous to the maximum power level.

17. The star-delta multi-level starter of claim 14, wherein said connections in said level changing circuit for changing the power levels during starting and slow stopping comprise:

connections for every AND gate, consisting of series circuit of said closed contact of said first slow stop control relay, connected to said output of said AND gate, with said contact of said second zero relay, connected to tap of coil of said level relay of next power level; and of series circuit of said opened contact of said first slow stop control relay, connected to said output of said AND gate, with said contact of said second zero relay, connected to tap of coil of the level relay of previous power level;

connections of contacts of said level relays and of contacts of said second slow stop control relay included in circuits between said phase line and said taps of the coils of said level relays, so that, in accordance with initiated action, the last-actuated level relay disconnects said conducting circuit connecting said phase line to said coil of said level relay of previous power level and configures conducting circuit connecting said phase line to said actuated coil of said level relay of lastly actuated power level; and connection of contacts of said level relays in conducting series circuit attached between level control line of actuated power level and said phase line.

\* \* \* \* \*